US011818235B1

(12) United States Patent
Teshler et al.

(10) Patent No.: US 11,818,235 B1
(45) Date of Patent: Nov. 14, 2023

(54) SYSTEMS, DEVICES AND METHODS FOR HARDWARE ACCELERATED UNIVERSAL ROUTING INTERFACE

(71) Applicant: GuardKnox Cyber Technologies Ltd., Ramla (IL)

(72) Inventors: Dionis Teshler, Tel Aviv (IL); David Foox, Ramla (IL); Nissim Dangur, Ramla (IL); Yoav Bar-Yoseph, Ramla (IL); Moshe Shlisel, Rosh Ha Ain (IL)

(73) Assignee: GuardKnox Cyber Technologies Ltd., Ramla (IL)

( * ) Notice: Subject to any disclaimer, the term of this patent is extended or adjusted under 35 U.S.C. 154(b) by 0 days.

(21) Appl. No.: 18/057,664

(22) Filed: Nov. 21, 2022

(51) Int. Cl.
*H04L 69/08* (2022.01)
*H04L 45/00* (2022.01)
*H04L 69/321* (2022.01)
*H04L 67/12* (2022.01)

(52) U.S. Cl.
CPC ............ *H04L 69/08* (2013.01); *H04L 45/72* (2013.01); *H04L 67/12* (2013.01); *H04L 69/321* (2013.01)

(58) Field of Classification Search
CPC ..... H04L 61/2592; H04L 45/72; H04L 67/12; H04L 69/321; H04L 12/46; H04L 12/66; H04L 41/0226; H04L 61/10; H04L 61/25; H04L 65/102; H04L 65/60; H04L 67/125; H04L 69/324; H04L 69/325;
(Continued)

(56) References Cited

U.S. PATENT DOCUMENTS 7,444,454 B2 10/2008 Yancey et al.
7,523,237 B2 4/2009 Gerig
7,689,757 B2 3/2010 Yancey et al.
(Continued)

OTHER PUBLICATIONS

Argus Cyber Security, "The Rising Demand for Automotive IDPS and How to Maximize Performance Using NXP S32F Processors"; pp. 1-9, 2022.
(Continued)

*Primary Examiner* — Ian N Moore
*Assistant Examiner* — Latresa A McCallum
(74) *Attorney, Agent, or Firm* — GREENBERG TRAURIG, LLP

(57) ABSTRACT

Systems and methods of the present disclosure enable a universal router within a vehicle. The universal router includes a reception pipeline that ingests layer 2/layer 3 (L2/L3) communications associated with each L2/L3 communication protocol, extracts communication data from the L2/L3 communications and generates a Layer 4 and/or Layer 5 (L4/L5) data unit for each L2/L3 communication based on the communication data. A processor ingests the L4/L5 data units and generates transformed L4/L5 data units based on predefined rules. A router determines a destination interface associated with each transformed L4/L5 data unit based on the communication data and routes each transformed L4/L5 data unit to a transmission pipeline associated with each destination interface. The transmission pipeline extracts the communication data from each transformed L4/L5 data unit, generates a transmitted communication for the communication data according to each L2/L3 communication protocol and transmits each transmitted communication via the associated destination interface.

28 Claims, 10 Drawing Sheets

(58) Field of Classification Search
CPC . H04L 69/326; H04L 69/327; G06F 16/1794; G06F 16/88
See application file for complete search history.

(56) References Cited

U.S. PATENT DOCUMENTS

| | | | |
|---|---|---|---|
| 8,232,871 | B2 | 7/2012 | Lesesky |
| 8,601,595 | B2 | 12/2013 | Gelvin et al. |
| 8,705,527 | B1 | 4/2014 | Addepalli et al. |
| 9,083,581 | B1 | 7/2015 | Addepalli et al. |
| 9,173,100 | B2 | 10/2015 | Ricci |
| 10,419,338 | B2 | 9/2019 | Gray |
| 10,587,534 | B2 | 3/2020 | Gray |
| 10,594,515 | B2 | 3/2020 | Sung et al. |
| 10,906,398 | B2 | 2/2021 | Ricci |
| 2016/0255575 | A1 | 9/2016 | Ricci |
| 2017/0220499 | A1 | 8/2017 | Gray |
| 2018/0183876 | A1* | 6/2018 | Kakiya ............ H04L 12/40136 |
| 2019/0123480 | A1* | 4/2019 | Takamatsu ............ B60K 37/00 |
| 2020/0007414 | A1* | 1/2020 | Smith .................... G06Q 30/08 |
| 2020/0008044 | A1* | 1/2020 | Poornachandran ... H04W 16/18 |
| 2020/0104182 | A1 | 4/2020 | Tewari et al. |
| 2021/0026684 | A1 | 1/2021 | Giri et al. |

OTHER PUBLICATIONS

Caulfield et al., "A Cloud-Scale Acceleration Architecture", Microsoft Corporation, IEEE 2016.

Kim et al., "Gateway Framework for In-Vehicle Networks Based on CAN, FlexRay, and Ethernet", IEEE Transactions on Vehicular Technology, Nov. 2014.

George et al., "Novo-G#: Large-Scale Reconfigurable Computing with Direct and Programmable Interconnects", 2016 IEEE High Performance Extreme Computing Conference.

* cited by examiner

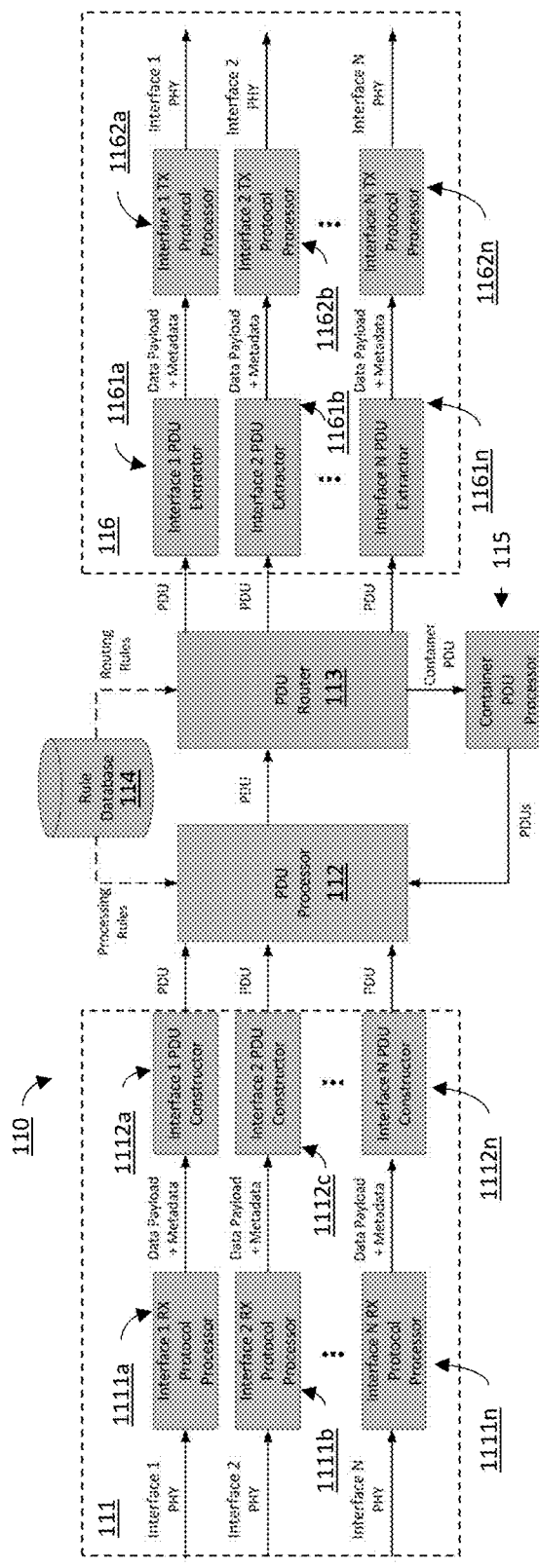
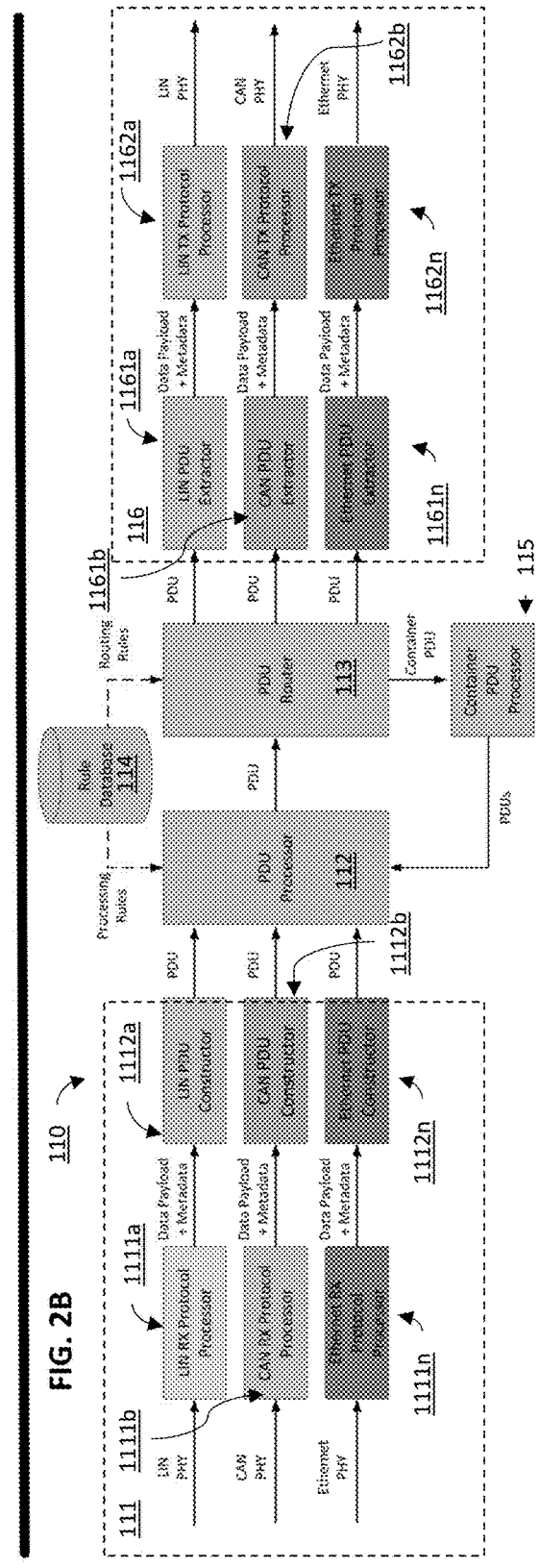
FIG. 2A
FIG. 2B

FIG. 4

Exemplary Routing Ruleset

| 4 Byte - PDU ID | 1 Byte – Dst. ID |
|---|---|
| 0x000011A1 | 0x01 |
| 0x00D011A1 | 0x04 |
| 0x00D01241 | 0x15 |

Exemplary PDU

| 32 bit PDU ID | 32 bit PDU Length | 8 bit Dest. ID | 0-1500 Bytes of Data | 4 Byte CRC |
|---|---|---|---|---|
| 0x000011A1 | 0x00000080 | 0x01 | 16 Bytes of Data | CRC |

| 32 bit PDU ID | 32 bit PDU Length | 8 bit Dest. ID | 0-1500 Bytes of Data | 4 Byte CRC |
|---|---|---|---|---|
| 0x00D011A1 | 0x00000010 | 0x04 | 16 bits of Data | CRC |

| 32 bit PDU ID | 32 bit PDU Length | 8 bit Dest. ID | 0-1500 Bytes of Data | 4 Byte CRC |
|---|---|---|---|---|
| 0x00D01241 | 0x000003E8 | 0x15 | 1000 Bytes of Data | CRC |

FIG. 7

SYSTEMS, DEVICES AND METHODS FOR HARDWARE ACCELERATED UNIVERSAL ROUTING INTERFACE

FIELD OF TECHNOLOGY

The present disclosure generally relates to systems, devices and/or methods for hardware accelerated universal routing of communications, including, for example, universal communications interfacing in vehicle communication networks.

BACKGROUND OF TECHNOLOGY

Vehicle communications networks have become increasingly complex, with a multitude of domain gateways and/or domain electronic control units (ECUs). The vehicle communication networks may be often employ multiple communication protocols. Typically, such communication networks rely on software handling of level 3 (L3) and above communications in the OSI model. In some cases, the hardware running the software may be dedicated for a particular communication protocol.

SUMMARY OF DESCRIBED SUBJECT MATTER

In some aspects, the techniques described herein relate to a system, including: a communication routing device located within a vehicle; wherein the communication routing device may be an intermediary for a plurality of communication networks of the vehicle so that the communication routing device receives all electronic messages transmitted between the plurality of communication networks; wherein the plurality of communication networks of the vehicle includes a plurality of electronic control units (ECUs); wherein the communication routing device includes: at least one reception pipeline; wherein the at least one reception pipeline may be configured to: receive at least one layer 2/layer 3 (L2/L3) communication associated with the at least one L2/L3 communication protocol; extract communication data from the at least one L2/L3 communication according to at least one protocol specific layer L2/L3 processor associated with the at least one L2/L3 communication protocol; generate at least one Layer 4 and/or Layer 5 (L4/L5) data unit associated with the at least one L2/L3 communication based at least in part on the communication data; wherein the L4/L5 data unit includes a L4/L5 representation of the communication data; at least one rules database in communication with at least one of at least one processor, and/or at least one router; wherein the at least one rules database includes at least one predefined rule configured to define operations on the communication data by at least one of the at least one processor and/or the at least one router; the at least one processor; wherein the at least one processor may be configured to: ingest the at least one L4/L5 data unit; generate at least one transformed L4/L5 data unit based at least in part on at least one transformation to the at least one L2/L3 communication based at least in part on the at least one L4/L5 data unit and the at least one predefined rule associated with the at least one L4/L5 data unit; the at least one router; wherein the at least one router may be configured, based at least in part on the at least one predefined rule, to: determine at least one destination interface associated with the communication data based least in part on the at least one transformed L4/L5 data unit; determine at least one transmission pipeline associated with the at least one destination interface; route the at least one transformed L4/L5 data unit to the at least one transmission pipeline; the at least one transmission pipeline; wherein the at least one transmission pipeline may be configured to: extract the communication data from the at least one transformed L4/L5 data unit; generate at least one transmitted communication associated with the communication data according to at least one protocol specific L2/L3 transmission processor associated with the at least one L2/L3 communication protocol; wherein the at least one transmitted communication includes an L2/L3 representation of the communication data; transmit at least one transmitted communication associated with the at least one L2/L3 communication protocol via the at least one destination interface.

In some aspects, the techniques described herein relate to a system, wherein the at least one L4/L5 data unit includes an AUTOSAR-compliant Protocol Data Unit (PDU).

In some aspects, the techniques described herein relate to a system, wherein the communication routing device may be compliant with operation of an AUTOSAR PDU Router module.

In some aspects, the techniques described herein relate to a system, wherein the at least one transformation includes at least one of: at least one data formatting, at least one protocol parameter definition, at least one communication control operation, at least one calculation on the data, or at least one security verification and/or acceleration.

In some aspects, the techniques described herein relate to a system, wherein the at least one L2/L3 communication protocol includes at least one of: CAN, CAN-HS, CAN-FD, CAN-XL, LIN, Ethernet 10/100/1000Base-T1, Ethernet 10/100/1000Base-TX, 10Base-T1s, GPIO, RS232, USB, or Firewire.

In some aspects, the techniques described herein relate to a system, wherein the at least one reception pipeline includes one communication protocol-specific reception pipeline per communication protocol-specific source L2/L3 interface.

In some aspects, the techniques described herein relate to a system, wherein the at least one reception pipeline includes one communication protocol-specific reception pipeline per communication protocol.

In some aspects, the techniques described herein relate to a system, wherein the communication routing device further includes: at least one container L4/L5 data unit processor configured to: receive the at least one L4/L5 data unit; extract a plurality of L4/L5 data sub-units packaged within the at least one L4/L5 data unit; and generate a plurality of L4/L5 data units associated with the plurality of L4/L5 data sub-units.

In some aspects, the techniques described herein relate to a system, wherein the communication routing device further includes: at least one container L4/L5 data unit processor configured to: receive the at least one L4/L5 data unit, wherein the at least one L4/L5 data unit may be a plurality of L4/L5 data units; and generate a container L4/L5 data unit that nests the plurality of L4/L5 data sub-units into a single data unit.

In some aspects, the techniques described herein relate to a system, wherein the communication routing device may be integrated into a single chip.

In some aspects, the techniques described herein relate to a system, wherein the communication routing device may be integrated into an IP core on an FPGA.

In some aspects, the techniques described herein relate to a system, wherein the communication routing device may be configured to intercept and route L2/L3 data traffic associated with a vehicle gateway.

In some aspects, the techniques described herein relate to a system, wherein the communication routing device may be integrated into a vehicle to route L2/L3 data traffic associated with the vehicle gateway.

In some aspects, the techniques described herein relate to a system, wherein the rules database is configured to be updated by over-the-air (OTA) update.

In some aspects, the techniques described herein relate to a method, including: receiving, by at least one reception pipeline of a communication routing device located within a vehicle, at least one layer 2/layer 3 (L2/L3) communication associated with the at least one L2/L3 communication protocol; wherein the communication routing device may be an intermediary for a plurality of communication networks of the vehicle so that the communication routing device receives all electronic messages transmitted between the plurality of communication networks; wherein the plurality of communication networks of the vehicle includes a plurality of electronic control units (ECUs); wherein the communication routing device includes at least one rules database storing at least one predefined rule configured to define operations on the communication data by the communication routing device; extracting, by the reception pipeline, communication data from the at least one L2/L3 communication according to at least one protocol specific layer L2/L3 processor associated with the at least one L2/L3 communication protocol; generating, by the reception pipeline, at least one Layer 4 and/or Layer 5 (L4/L5) data unit associated with the at least one L2/L3 communication based at least in part on the communication data; wherein the L4/L5 data unit includes an L4/L5 representation of the communication data; ingesting, by at least one processor of the communication routing device, the at least one L4/L5 data unit; generating, by the at least one processor, at least one transformed L4/L5 data unit based at least in part on at least one transformation to the at least one L2/L3 communication based at least in part on the at least one L4/L5 data unit and the at least one predefined rule associated with the at least one L4/L5 data unit; determining, by at least one router of the communication routing device, at least one destination interface associated with the communication data based least in part on the at least one transformed L4/L5 data unit; determining, by the at least one router, at least one transmission pipeline associated with the at least one destination interface; routing, by the at least one router, the at least one transformed L4/L5 data unit to the at least one transmission pipeline; extracting, by at least one transmission pipeline of the communication routing device, the communication data from the at least one transformed L4/L5 data unit; generating, by the at least one transmission pipeline, at least one transmitted communication associated with the communication data according to at least one protocol specific L2/L3 transmission processor associated with the at least one L2/L3 communication protocol; wherein the at least one transmitted communication includes an L2/L3 representation of the communication data; transmitting, by the at least one transmission pipeline, at least one transmitted communication associated with the at least one L2/L3 communication protocol via the at least one destination interface.

In some aspects, the techniques described herein relate to a method, wherein the at least one L4/L5 data unit includes an AUTOSAR-compliant Protocol Data Unit (PDU).

In some aspects, the techniques described herein relate to a method, wherein the communication routing device may be compliant with operation of an AUTOSAR PDU Router module.

In some aspects, the techniques described herein relate to a method, wherein the at least one transformation includes at least one of: at least one data formatting, at least one protocol parameter definition, at least one communication control operation, at least one calculation on the data, or at least one security verification and/or acceleration.

In some aspects, the techniques described herein relate to a method, wherein the at least one L2/L3 communication protocol includes at least one of: CAN, CAN-HS, CAN-FD, CAN-XL, LIN, Ethernet 10/100/1000Base-T1, Ethernet 10/100/1000Base-TX, 10Base-T1s, GPIO, RS232, USB, or Firewire.

In some aspects, the techniques described herein relate to a method, wherein the at least one reception pipeline includes one communication protocol-specific reception pipeline per communication protocol-specific source L2/L3 interface.

In some aspects, the techniques described herein relate to a method, wherein the at least one reception pipeline includes one communication protocol-specific reception pipeline per communication protocol.

In some aspects, the techniques described herein relate to a method, further including: wherein the communication routing device further includes: receiving, by at least one container processor of the communication routing device, the at least one L4/L5 data unit; extracting, by the at least one container processor, a plurality of L4/L5 data sub-units packaged within the at least one L4/L5 data unit; and generating, by the at least one container processor, a plurality of L4/L5 data units associated with the plurality of L4/L5 data sub-units.

In some aspects, the techniques described herein relate to a method, further including: wherein the communication routing device further includes: receiving, by at least one container processor of the communication routing device, the at least one L4/L5 data unit, wherein the at least one L4/L5 data unit may be a plurality of L4/L5 data units; and generating, by the at least one container processor, a container L4/L5 data unit that nests the plurality of L4/L5 data sub-units into a single data unit.

In some aspects, the techniques described herein relate to a method, wherein the communication routing device may be integrated into a single chip.

In some aspects, the techniques described herein relate to a method, wherein the communication routing device may be integrated into an IP core on an FPGA.

In some aspects, the techniques described herein relate to a method, wherein the communication routing device may be configured to intercept and route L2/L3 data traffic associated with a vehicle gateway.

In some aspects, the techniques described herein relate to a method, wherein the communication routing device may be integrated into a vehicle to route L2/L3 data traffic associated with the vehicle gateway.

In some aspects, the techniques described herein relate to a method, wherein the rules database is configured to be updated by over-the-air (OTA) update.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2A depicts an exemplary high-level block diagram of universal L5 communication router with any amount of interfaces and interface types in accordance with one or more embodiments of the present disclosure.

FIG. 2B illustrates an exemplary high-level block diagram of universal L5 communication router with 3 types of interfaces—CAN, LIN and Ethernet in accordance with one or more embodiments of the present disclosure.

FIG. 4 depicts an example of CAN/LIN/Ethernet PDU construction from original frame in accordance with one or more embodiments of the present disclosure.

FIG. 7 depicts an example of PDU destination ID tagging in accordance with one or more embodiments of the present disclosure.

DETAILED DESCRIPTION

Figure 1:
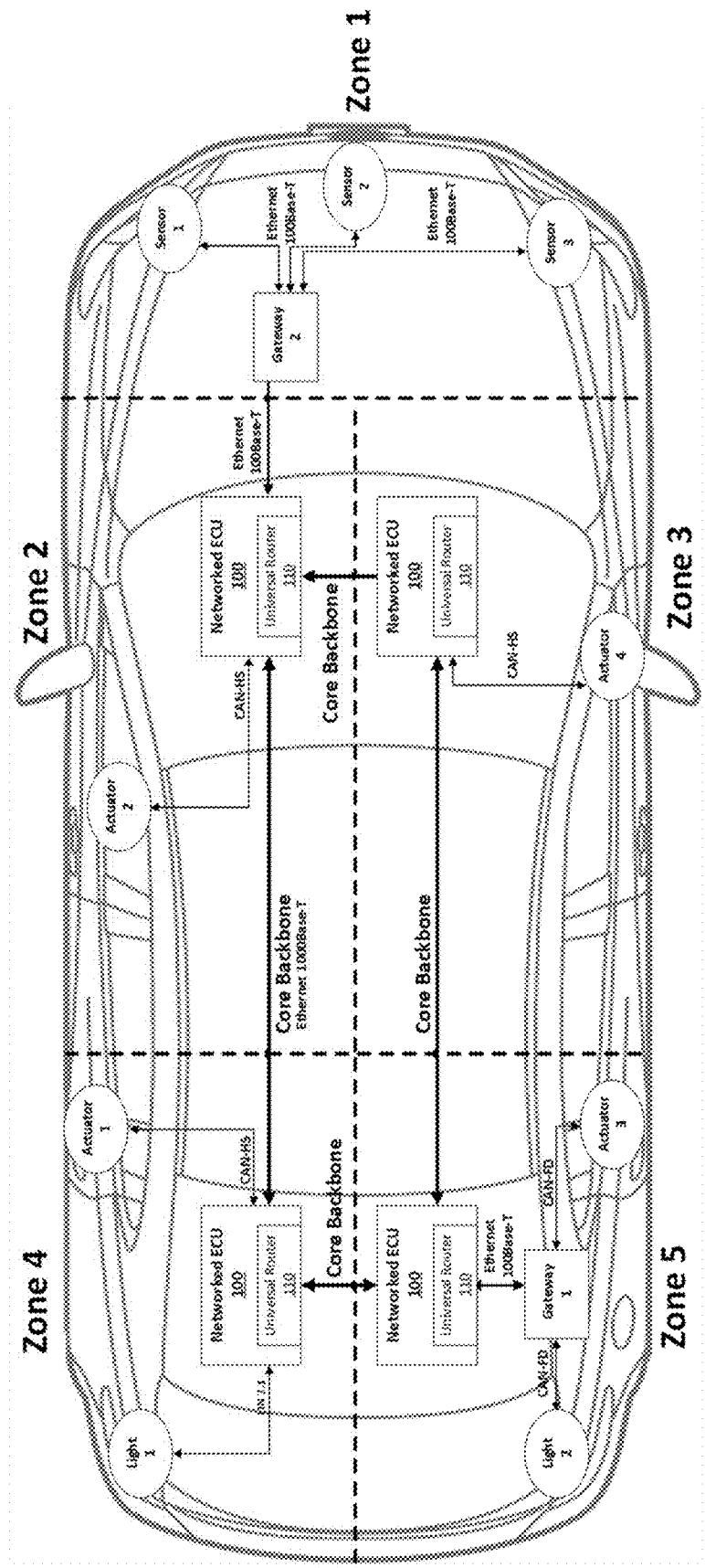
FIG. 1 may be a block diagram of a universal router integrated into a vehicle E/E architecture in accordance with one or more embodiments of the present disclosure.

Various detailed embodiments of the present disclosure, taken in conjunction with the accompanying FIGS., are disclosed herein; however, it may be to be understood that the disclosed embodiments are merely illustrative. In addition, each of the examples given in connection with the various embodiments of the present disclosure may be intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" may be not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set may be to be interpreted as meaning each of the items singularly as alternatives, as well as any combination of the listed items.

FIGS. 1 through 9 illustrate systems and methods of universal vehicle communications routing via a hardware-based universal router. The following embodiments provide technical solutions and technical improvements that overcome technical problems, drawbacks and/or deficiencies in the technical fields involving slow communications routing that inefficiently utilize processing resources of a vehicle gateway ECU. As explained in more detail, below, technical solutions and technical improvements herein include aspects of improved routing efficiency and speed between vehicle ECUs by integrating one or more hardware communication accelerator into a vehicle E/E architecture that provide universal routing (up to L5) functionality via universal hardware interfacing, which is compatible with widely used automotive software routing solutions. Based on such technical features, further technical benefits become available to users and operators of these systems and methods. Moreover, various practical applications of the disclosed technology are also described, which provide further practical benefits to users and operators that are also new and useful improvements in the art.

In some embodiments, modern vehicles may include multiple of Electronic Control Units (ECUs) including processing resources for operating the vehicle functions. In some embodiments, these ECUs may be interconnected through any one or more of a plurality of communication interfaces (such as Ethernet 10Base-T1s, Ethernet 10Base-TX, Ethernet 100Base-T1, Ethernet 100Base-TX, Ethernet 1000Base-T1, Ethernet 1000Base-TX, Ethernet 2500Base-T1, Ethernet 2500Base-TX, CAN, CAN-HS, CAN-XL, CAN-FD, LIN 2.1, FlexRay, GPIO, RS232, USB, Firewire, etc.) to form a network of ECUs that define a vehicle's electrical/electronic (E/E) architecture. ECUs may be also be clustered together into logical or physical networks according to functional domain (e.g. powertrain, body, infotainment, ADAS, tec.), location (e.g., a zonal architecture), or communication requirements (high speed local interconnect, latency, etc.).

In some embodiments, modern vehicle E/E architectures are rapidly evolving. In some embodiments, vehicle electrical/electronics E/E architecture may define within a vehicle platform at least the following elements:

a. The ECUs required for the vehicle, their technical specifications, their functions and their cost targets
b. The logical architecture of the networks interconnecting them
c. The physical locations of the ECUs within the vehicle
d. The physical topology of the network interconnecting the ECUs
e. Wiring (power and data) to implement the network architecture design, including type of wiring and its routing throughout the vehicle.

In some embodiments, the vehicle E/E may include one or more gateway ECUs that interconnect networks of ECUs. The vehicle E/E may utilize a central gateway E/E architecture, domain gateway E/E architecture, zonal E/E architecture, or other E/E architecture that defines that structure and topology of in-vehicle ECU network(s).

In some embodiments, in a central gateway E/E architecture, a central gateway ECU interconnects networks (e.g., four domain-specific networks, or other number of domain-specific networks), each based on a different communication protocol (CAN-HS, CAN-FD, Ethernet 100Base-T, Ethernet1000Base-T). Each network may include multiple ECUs (e.g. Anti-lock Braking System (ABS) ECU, Adaptive Front lighting System (AFS), Electronic Stability Program (ESP) ECU, etc.) communicating either via, e.g., a central bus (in case of bus physical architecture protocols such as CAN) or through a switch (in case of Ethernet) which may be built into one of the ECUs. Each ECU may have other ECUs, electrical components (e.g. actuators), electronic components (e.g. sensors) connected to it using various types of communication (e.g. LIN, Ethernet, analog signals, digital signals, etc.). In some embodiments, the gateway ECU's main role may be routing all of the signals between the various network, usually without processing the data.

In some embodiments, in a domain E/E architecture, each domain may include a domain controller (e.g., ECU). In some embodiments, domain controller E/E architecture may include a separate dedicated ECU for each domain such that each domain controller may serve as a compute platform for advanced functionality to run without adding additional ECUs to each domain. In some embodiments, each domain may have its own controller capable of advanced computing and of high-speed communication required for functionality which may be part of this domain (which may include other domains as well). Domain controllers may then be interconnected, e.g., via a high-speed backbone, such as Ethernet. Such backbone may be either enabled by a dedicated gateway domain controller ECU or built into one or more of the domain controllers. Typically, the routing of communication inside the gateways (and in some cases even switching) may be done using software stacks with dedicated hardware accelerators in some cases. Routing of communication may be generally handled by dedicated and verified (sometimes certified) software stacks, such as, e.g., AUTOSAR PDU Router Module.

In some embodiments, the domains may include a grouping in-vehicle functions according to category. For example, the domains may include, e.g., advanced driver assistance systems (ADAS), vehicle body, chassis, driveline, connectivity brakes, human-machine-interface (HMI), interior control, among other groupings of functionalities or any combination thereof. In some embodiments, each domain controller may provide advanced compute capabilities, network management and communication management for the network segment. The domain controllers may be interconnected through a high-speed backbone, e.g., Ethernet such as Ethernet 1000Base-T1 (Gigabit Ethernet) or higher. In some embodiments, a particular domain controller may provide a backbone hub (e.g., backbone Ethernet switch), such as the ADAS domain controller, and all the other domain controllers may interconnect through the backbone hub. In some embodiments, the backbone hub may be in a dedicated gateway domain controller ECU that may be configured to provide dedicated resources for communication management.

In some embodiments, the wiring costs of domain E/E may be reduced by using Zonal Architecture utilizing zonal gateways instead of a central hub. In some embodiments, therefore, the E/E architecture may include a zonal architecture where each domain controller or other core ECU having high performance compute or a dedicated communication ECU may be configured as zonal gateways associated with particular zones or positions within the vehicle to reduce wiring. In some embodiments, the core ECUs may interconnect to route communication traffic from one location to another, enabling the communication to hop from a nearby core ECU to another, further core ECU.

In some embodiments, the speed of delivery of a communication may be safety and/or operationally critical. Thus, reducing the latency of communications across the ECUs of the vehicle E/E architecture may be improved through the use of a hardware-based universal router integrated in each gateway controller and/or core ECU as detailed herein according to one or more embodiments of the present disclosure.

Among those benefits and improvements that have been disclosed, other objects and advantages of this invention may be become apparent from the following description taken in conjunction with the accompanying figures. Detailed embodiments of the present invention are disclosed herein; however, it may be to be understood that the disclosed embodiments are merely illustrative of the invention that may be embodied in various forms. In addition, each of the examples given in connection with the various embodiments of the present invention may be intended to be illustrative, and not restrictive.

For example, while illustrative examples of various embodiments detailed herein are described to be implemented in the automotive industry, such as in various types of moving vehicles (e.g., cars, trucks, cranes, buses, etc.); many other implementations may become apparent to those of ordinary skill in the art; and the principles, methods, systems, and devices of the present invention may be similarly implemented in various other environments which utilize computing devices. For instance, the principles, methods, systems, and devices of the present invention may be implemented, with or without any modification(s) that may become apparent to those of ordinary skill in the art, in numerous industries, environments, and computing devices such as, but not limited to, aviation, industrial control, computers, medical devices, financial terminals, utilities management, home security, critical infrastructure computing systems (e.g., traffic lights, power grids, etc.), and other similarly suitable applications.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

The term "based on" may be not exclusive and allows for being based on additional factors not described, unless the context clearly dictates otherwise. In addition, throughout the specification, the meaning of "a," "an," and "the" include plural references. The meaning of "in" includes "in" and "on."

It may be understood that at least one aspect/functionality of various embodiments described herein may be performed in real-time and/or dynamically. As used herein, the term "real-time" may be directed to an event/action that may be occur instantaneously or almost instantaneously in time when another event/action has occurred. In some embodiments, the terms "instantaneous," "instantaneously," "instantly," and "in real time" refer to a condition where a time difference between a first time when an electronic request may be transmitted and a second time when an electronic response to the request may be received may be no more than 1 second. In some embodiments, the time difference between the request and the response may be between less than 1 second and several seconds (e.g., 5-10 seconds).

As used herein, the term "dynamic(ly)" means that events and/or actions may be triggered and/or occur without any human intervention. In some embodiments, events and/or actions in accordance with the present invention may be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the terms "communication" and "message" may be used interchangeably and it shall be assumed that the communication may be corresponds to a single message or to a plurality of messages.

As used herein, the term "runtime" corresponds to any behavior that may be dynamically determined during an execution of a software application or at least a portion of software application.

In some embodiments, the inventive specially programmed computing systems with associated devices configured to operate in the distributed network environment, communicating over a suitable data communication network (e.g., the Internet, etc.) and utilizing at least one suitable data communication protocol (e.g., coresX/SPX, X.25, AX.25, AppleTalk™, TCP/cores (e.g., HTTP), etc.). In some embodiments, the inventive specially programmed computing systems with associated devices configured to process/track/manage interactions associated with at least 10 other electronic/computing devices (e.g., but not limited to, 10-99), at least 100 other electronic/computing devices (e.g., but not limited to, 100-999), at least 1,000 (e.g., but not limited to, 1,000-9,999), at least 10,000 other electronic/computing devices (e.g., but not limited to, 10,000-99,999), at least 100,000 other electronic/computing devices (e.g., but not limited to, 100,000-999,999), at least 1,000,000 other electronic/computing devices (e.g., but not limited to, 1,000,000-9,999,999), at least 10,000,000 other electronic/computing devices (e.g., but not limited to, 10,000,000-99,999,999), at least 100,000,000 other electronic/computing devices (e.g., but not limited to, 100,000,000-999,999,999), at least 1,000,000,000 other electronic/computing devices (e.g., but not limited to, 1,000,000,000-10,000,000,000).

As used herein, the term "security" refers to a cyber security.

As used herein, the term "safety" refers to the safe operation of the system from the functional perspective.

In some embodiments, the exemplary inventive computer system and the exemplary respective inventive device are configured to communicate with a multitude (e.g., up to 150) of Electronic Control Units (ECUs) which are responsible for a variety of vehicle functions (engine management, steering, pedals, electric windows, etc.). A typical ECU may be a computer module containing its own processor, memory and peripherals required to implement its functions and interface it with other systems in the vehicle. A typical ECU contains firmware and software which execute the functions it may be designed for.

In some embodiments, the exemplary inventive computer system and the exemplary respective inventive device allow to centralize the operation of a vehicle's numerous services/capabilities, such as advanced vehicle-to-vehicle (V2V) communication for increased safety, vehicle-to-infrastructure (V2I) communication for telemetry, communication with road and municipal infrastructure (e.g. traffic lights), communication with the local and national power grid for charging electric vehicles, infotainment with internet access and electronic wallet capabilities, and others. In some embodiments, the exemplary inventive computer system and the exemplary respective inventive device allow to centralize and provide common services that may be required to perform the vehicle's functions such as a remote management, Over-the-Air (OTA) update capability, update dissemination, ECU software flashing, ECU software recovery, monitoring, encryption, authentication, digital certificate and key management, secure storage, secure data processing, safe and secure in-vehicle testing of new capabilities, security monitor and others. In some embodiments, the exemplary inventive computer system and the exemplary respective inventive device allow to improve communication speed and efficiency throughout the various ECUs networked in the vehicle by providing each networked ECU with a hardware-based accelerator that may be configured for universal routing at the layer 4 (L4) or above layer of the OSI model using hardware interfaces.

In some embodiments, the exemplary inventive computer system and the exemplary respective inventive device utilize a Service Oriented Architecture (SOA) to provide common functions and interfaces which are configured as discrete and standalone components termed services. In some embodiments, the exemplary inventive computer system and the exemplary inventive device allow to offer the common services throughout the vehicle's network to any client of the exemplary vehicle's hardware/software as long as the client may be approved to utilize those services according to the policy of the system. In some embodiments, the exemplary inventive computer system and the exemplary respective inventive centralized device allow to configure and utilize the common services as independent of the vendors who design/implement them and of the clients who are using them. In some embodiments, the exemplary inventive computer system and the exemplary respective inventive centralized device are designed to offer the common services via standardized protocols and/or Application Program Interfaces (APIs).

In some embodiments, the exemplary inventive computer system and the exemplary respective inventive centralized device allow to offer common services to an ECU which performs its own specific functions via a communication that may or may not be session-based type (e.g., HTTP session, TCP session, etc.). In some embodiments, the communication may be stateful or stateless. In some embodiments, the exemplary inventive computer system and the exemplary respective inventive centralized device allow to offer common service to automotive ECUs that are typically designed communicate through multiple network protocols, which are not typically designed to interoperate via L4 or above in the OSI model.

Typically, each vehicle's ECU may be designed and manufactured by different Tier 1 suppliers. Typically, Tier 1 providers in the automotive industry are working only in the enclosed environments of their ECUs. Typically, integrating with other ECUs poses high implementation risks (components are typically designed to work in their own architecture with their own methodologies, integrating with others may be not typically a design goal). Typically, the individualized development may be lead to an increased scalability difficulty based on a need to account for the requirements of other ECUs and communication interfaces.

In some embodiments, the exemplary inventive computer system and the exemplary respective inventive centralized device (the exemplary centralized ECU) are based on an hardware-based implementation of a universal router for each networked ECU. In some embodiments, the exemplary inventive computer system and the exemplary respective inventive universal router 110 may be employed in various suitable vehicles (e.g., automotive, rail, marine, aviation) and other similarly suitable embedded systems (e.g., industrial control, medical, critical infrastructure, etc.).

In some embodiments, the exemplary inventive universal router 110 of the exemplary networked ECU 100 may be contain and/or support remote management services, remote monitoring services, Over-The-Air (OTA) update services, symmetric cryptography acceleration services (e.g. AES, DES), asymmetric cryptography acceleration services (e.g. RSA, ECC), certificate storage and verification against a certificate authority (CA), accelerate certificate authority services and issue and sign certificates and secure storage (e.g. encrypted memory, TPM (Trusted Platform Module)) service, centralized firewall, security configuration management, intrusion detection system (IDS), intrusion prevention system (IPS), and/or Lockdown Core (as described in U.S. patent application Ser. No. 15,486,055, which may be hereby incorporated herein for all purposes consistent with the principles detailed herein).

In some embodiments, the exemplary inventive universal router 110 may be associated with, connected to, integrated with, etc. a networked ECU 100, which may be contain hardware modules to implement and accelerate some of the capabilities, such as HSM (Hardware Security Module) module, TPM (Trusted Platform Module) module and/or cryptographic coprocessor.

In some embodiments, the exemplary networked ECU 100 may be designed to provide a real-time safe and secure environment for the various services to operate under, while completely isolating each discrete service component from one another (e.g., to prevent interference, ensure performance) and may be also isolate the handling of each of the connected networks or clients (for safety and quality of service considerations—provide clients with a predetermined level of service and performance or avoid interconnecting safety critical clients/networks with non-safety critical clients/networks). In some embodiments, the exemplary networked ECU 100 may include provisions which may be allow for a generic service API for every type of network protocol needed. In some embodiments, the exemplary networked ECU 100 may be configured to allow legacy protocols (e.g., CAN, LIN) to utilize the benefits of this architecture while providing maximal performance for modern protocols (e.g., Automotive Ethernet).

In some embodiments, the exemplary inventive universal router 110 may be associated with, connected to, integrated with, etc. a networked ECU 100 configured to account for each level of performance required for each client (and/or network) and provide real-time quality of service (QoS) to the required level. In some embodiments, the exemplary networked ECU 100 and/or inventive universal communication router 110 may be configured to meet a particular safety standard (e.g., ISO26262) and/or a particular cyber security standard (e.g., ISO15408), thus providing assurances that it may be operating correctly. In some embodiments, the exemplary networked ECU 100 may be configured to so that, while the exemplary networked ECU 100 may be certified as a platform, individual service(s) which is/are not safety/security critical do(es) not need to be certified.

In some embodiments, the exemplary inventive universal router 110 may be associated with, connected to, integrated with, etc. a networked ECU 100 configured to in accordance with an exemplary design depicted in FIG. 1. For example, the exemplary networked ECU 100 may be based on any suitable automotive computing hardware, such as, but not limited to, CPU/DSP/SoC/Microcontroller (e.g., Infineon Technologies AG' TriCore™ (Neubiberg, Germany), NXP Semiconductors N.V's MC57xx™ (Eindhoven, Netherlands), Renesas Electronics' R-Car (Tokyo, Japan), etc.). In some embodiments, the exemplary networked ECU 100 may be configured to have a firmware layer, containing, for example, a Board Support Package—BSP, Architecture Support Package—ASP, or a combination of both.

In some embodiments, the exemplary inventive universal router 110 may be associated with, connected to, integrated with, etc. a networked ECU 100 configured to run on an OS (e.g., AUTOSAR™, Linux™, other) or without (bare metal). In some embodiments, the exemplary networked ECU 100 may be configured to contain an API which may be configured to allow an access to all of its services and which may be allow for authentication of client ECUs and/or encryption of traffic between the exemplary networked ECU 100 and a particular client ECU or an external system (e.g., AUTOSAR based services API by Vector Informatik GmbH, Stuttgart Germany). In some embodiments, the exemplary networked ECU 100 may be configured to prioritize a real-time handling of client requests (e.g., safety-critical ECU operations/requests shall receive a higher priority than non-safety ECUs). In some embodiments, the exemplary networked ECU 100 may be configured to handle service requests on one or multiple request queues running on one or multiple processor cores. In some embodiments, the exemplary networked ECU 100 may be configured to manage access to all of its services according to a predetermined security policy, which may be designed to selectively allow an access to certain services by certain ECUs, and/or deny access to some services by some ECUs. In some embodiments, the networked ECU 100 may be configured to offload to hardware certain task(s) and/or transfer execution to auxiliary component(s).

In some embodiments, the exemplary inventive universal router 110 may be associated with, connected to, integrated with, etc. a universal router 110 configured to be responsible for any protocol handling and parsing. For example, the exemplary inventive universal router 110 may be configured to provide an access to the services API via one or more network communication protocol (e.g., CAN, Ethernet, etc.). In some embodiments, the exemplary inventive universal router 110 may be configured as its own dedicated ECU or be a part of an existing ECU within a vehicle. For example, the exemplary inventive universal router 110 may be integrated, e.g., on-die with the networked ECU 100 as a chiplet and/or coprocessor of the system-on-chip (SoC) of the networked ECU 100, integrated as an integrated intellectual property (cores) block into one of the processors of the networked ECU 100, integrated as an integrated intellectual property (cores) block into a Field Programmable Gate Array (FPGA) in the networked ECU 100 and/or on a separate die integrated with networked ECU 100 via a suitable processor hardware interface (e.g., PCIe, SATA, eSATA, etc.).

In some embodiments, the exemplary inventive universal router 110 may be associated with, connected to, integrated with, etc. a networked ECU 100 and/or universal router 110 may be configured to contain secure firmware which ensures that drivers for the hardware (part of the firmware) aren't exploited to gain unauthorized access to the hardware or to make it operate in a different way than intended for the system. Secure firmware may be typically firmware that may be written to comply with relevant safety standards (e.g. ISO 26262) and security standards (e.g. ISO 15408). In some embodiments, the exemplary networked ECU 100 and/or universal router 110 may be configured to contain a certified separation kernel (e.g., Green Hills Software Integrity, WindRiver VxWorks, Sysgo Pike OS, etc.). This may allow for a safe and secure separation between various networks (powertrain, convenience, body, infotainment, etc.), clients and/or services. In some embodiments, the exemplary networked ECU 100 and/or universal router 110 may be configured to prevent clients from one network from affecting services and/or a quality of service provided to any other network. In some embodiments, the exemplary innovative networked ECU 100 and/or universal router 110 may be contain a separate partition for each network, where, for example, the separation kernel may be implemented such as to provide a safe and secure separation between partitions in both memory address spaces (e.g., storage memory—ROM/Flash, and runtime memory—RAM) and/or in the processor time (for example, each partition would have its dedicated static and predetermined time slot at which instructions from such partition would be inserted into the runtime context for execution). In some embodiments, the exemplary networked ECU 100 and/or universal router 110 may be configured to allocate time slots to partitions according to the required quality of service (a safety critical partition may receive a longer time slot to allow it priority access to services, or receive more time slots compared to non-safety critical partitions).

In one illustrative embodiment, the exemplary inventive computer system with the exemplary inventive universal router 110 may be associated with, connected to, integrated with, etc. a networked ECU 100 based on a Xilinx, Inc.'s (San Jose, Calif.) Zynq® 7010 system-on-chip (SoC), which contains a dual core ARM A9 processor and Artix-7 FPGA. Such exemplary set-up may have 1 GB of DDR3 RAM and 4 GB of flash SSD, providing the operational and storage memory for the inventive system. An Ethernet interface may be connect the server to one vehicle network, such as the infotainment network which may be based on Ethernet communication through a built in Gigabit Ethernet controller in the Zynq and Marvell Alaska PHY (88E1116R). Another embodiment may utilize Broadcom BroadR-Reach Automotive Ethernet PHY. In some embodiments, the V2X communication network (Vehicle-to-everything) communication may be pass information from a vehicle to any entity that may affect the vehicle, and vice versa. Typically, a vehicular communication system incorporates at least one of other more specific types of communication such as, but not limiting to, V2I (Vehicle-to-Infrastructure), V2V (Vehicle-to-Vehicle), V2P (Vehicle-to-Pedestrian), V2D (Vehicle-to-Device) and/or V2G (Vehicle-to-Grid).

In some embodiments, the exemplary inventive universal router 110 may be configured to utilize any suitable communication protocol to communicate with other ECUs (such as Ethernet 10Base-T1, Ethernet 10Base-TX, Ethernet 100Base-T1, Ethernet 100Base-TX, Ethernet 1000Base-T1, Ethernet 1000Base-TX, CAN, CAN-HS, CAN-XL, CAN-FD, LIN 2.1, FlexRay, GPIO, RS232, USB, Firewire, etc.). In some embodiments, the exemplary networked ECU 100 may be configured such that the microkernel secures access to hardware resources (e.g. communication interfaces, cryptographic co-processor, etc.) so that every partition has access only to its allowed set resources, which are predetermined in the main configuration of the exemplary networked ECU 100.

In some embodiments, the exemplary inventive universal router 110 may be associated with, connected to, integrated with, etc. a networked ECU 100 configured to manage telematics ECUs which may be communicate with OEM and other suitable entities to send telemetry information about the vehicle and/or its usage (e.g., engine utilization, fuel efficiency, usage statistics, etc.). In some embodiments, the exemplary inventive computer system with the exemplary networked ECU 100 may be configured to manage telematics ECUs that may be also receive various commands to enable/disable features within themselves and/or other ECUs in the vehicle (e.g., enable various fuel efficiency modes, enable low performance mode in case of malfunction, etc.). For example, the telematics ECUs utilize the authentication service (which in turn may be also utilize the CA service) in order to authenticate (through a PKI) the remote entities with which they are communicating. For example, each entity establishes a communication with a handshake containing its signed digital certificate (X509 compliant) which may be verified by the authentication service. In one embodiment, the authentication service may be utilize the functions of the CA service to perform some of its operations. In some embodiments, the CA service may be have an instance in the infotainment partition to which all other partitions are using (through inter-partition communication mechanisms mediated by the kernel—such direct socket connection or message passing through shared memory). In another embodiment, the CA service may be replicated to every partition which requires it in order to avoid bottlenecks in utilization and access to the service from multiple partitions at once.

In some embodiments, the exemplary inventive universal router 110 may be associated with, connected to, integrated with, etc. a networked ECU 100 configured to manage the V2X ECUs that may be conduct real-time communication with external entities such as vehicles, pedestrians and/or infrastructure (traffic lights, roads, etc.). In some embodiments, such V2X communications may be encrypted. For example, the networked ECU 100 may be configured to use a secure and efficient encryption algorithm AES256 for V2X communications by the V2X ECUs. In some embodiments, the exemplary networked ECU 100 (the remote management server) may be configured to utilize a built-in cryptographic coprocessor and communication encryption service to encrypt and decrypt data to/from the V2X ECUs. For example, to select an appropriate encryption key, the communication encryption service may be utilize the appropriate certificate (in case there are separate certificates for each entity or provider or municipality or any other separation) and which will allow both parties (the V2X ECU and the external entity) to exchange symmetric cryptography keys (using well known algorithms such as Diffie-Helman key exchange algorithms). The symmetric key would allow the coprocessor to encrypt and decrypt data at high speed (utilizing hardware acceleration) without the actual V2Xs ECUs handling any encryption and/or key management. For example, the authentication service may be utilize the functions of the CA service to perform at least some of its operations.

FIG. 1 may be a block diagram of a universal router integrated into an ECU which is part of a vehicle E/E architecture in accordance with one or more embodiments of the present disclosure.

In some embodiments, a vehicle may include multiple networked ECUs 100 networked within the vehicle according to a vehicle E/E architecture, e.g., zonal, domain, central gateway, or other E/E architecture. In some embodiments, to facilitate faster and more efficient routing of communications, and thus lower latency communications between networked ECUs 100, sensors gateways and/or actuators, one or more of the networked ECUs 100 may include a universal router 110. Here, a zonal architecture may be depicted where each networked ECU 100 operates as a zone gateway controller with a universal router 110, though the networked ECUs 100 and the universal routers 110 may also be employed in any other vehicle E/E architecture by incorporating the universal router 110 into or in association with one or more networked ECU 100. For example, in a domain architecture, each domain gateway controller may include a universal router 110, or in a central gateway architecture, the central gateway controller and/or one or more ECUs/domain ECUs may include universal router 110.

In some embodiments, the universal router 110 may be associated with a networked ECU 100 by any suitable hardware configuration. In some embodiments, the universal router 110 may be incorporated on-die on the networked ECU 100 system-on-chip, one or more logic blocks within the central processing unit (CPU) of the networked ECU 100, as a separate integrated circuit within the SoC and/or CPU package of the networked ECU 100, as a separate integrated circuit on a discrete chip connected via a suitable hardware interface to the networked ECU 100, as an IP core on an FPGA, or any combination thereof. In some embodiments, the universal router 110 may include any suitable hardware logic circuit, for example an application specific integrated circuit (ASIC), programmable logic device (PLD), digital signal processor (DSP), field programmable gate array (FPGA), logic gate, register, semiconductor device, chip, microchip, chip set, and so forth or any combination thereof. In some embodiments, the universal router 110 may be operably connected to the networked ECU 100 via a hardware interface, such as, e.g., PCIe, SATA, eSATA, USB, Firewire, Thunderbolt, DIMM, RS232, or other suitable serial and/or parallel interface technology or any combination thereof.

In some embodiments, the universal router 110 may be configured to perform communication routing for the networked ECU 100. Typically, the ECUs of a vehicle send and receive layer 2 (L2) and/or layer 3 (L3) communications over the vehicle communication interfaces. L2 and/or L3 communications are lower level layers of the OSI model and typical ECUs ordinarily route the L2 and/or L3 communications by software implemented processing and routing. This software usually utilizes L5 data in order to make routing decisions. Such a scheme requires processing resources from the compute cores of the ECU, which may more advantageously be applied to other tasks, such as safety critical operations and/or additional vehicle functionally and services. Moreover, the use of software based processing and routing adds latency to the routing of a particular communication from origin to destination through one or more ECUs. The more ECUs needed to relay a communication ("hops") from origin to destination compounds the latency. Accordingly, the universal router 110 may be used in place of the L2/L3/L5 communication routing performed by ECU software.

In some embodiments, the universal router 110 implements hardware-based communication routing that processes communications at the L4 or greater layer of the OSI model. Communications of L4 or greater are typically only processed and routed via software routing. Accordingly, the universal router 110 may receive communications passing to and/or through the networked ECU 100 (including, e.g., a domain controller, gateway controller, zone ECU, etc.), convert the communications to L4 or higher layer communications, process the communications, convert the communications back to the original L3 or lower layer, and transmit the communications to the next destination. For example, the universal router 110 may intercept communications to and from each networked ECU 100. In another example, each networked ECU 100 may be configured to divert communications to the universal router 110 automatically instead of processing and routing the communications itself.

In some embodiments, to do so, the universal router 110 may include reception and transmission pipelines for receiving and transmitting communications at the L3 or lower layer of the OSI model. In some embodiments, to facilitate universal compatibility in the vehicle, the universal router 110 may be configured with a reception pipeline and a transmission pipeline specific to each networking interface (e.g. CAN, CAN-HS, CAN-FD, CAN-XL, LIN, Ethernet 100/1000Base-T1, 10Base-T1s and others). In some embodiments, the vehicle network may include multiple communication lanes utilizing a particular interface type (e.g., multiple may be or Ethernet communication lanes). The reception pipeline and/or the transmission pipeline may include a lane-specific pipeline for each communication lane that may be compatible with the respective interface type, or may have a combined interface-specific pipeline for all communication lanes of a particular interface type, or any combination thereof.

In some embodiments, the reception pipeline and the transmission pipeline may include separate and/or shared hardware resources for a particular interface and/or lane. For example, the reception pipeline may include a receiver of a particular interface and/or lane, and the transmission pipeline may include a transmitter of a particular interface and/or lane separate from the receiver. In another example, the reception pipeline and the transmission pipeline may share a common transceiver for receiving and transmitting the L3 or lower communications of a particular interface and/or lane.

In some embodiments, the reception pipeline may include receive at least one communication associated with the at least one communication interface protocol for at least one communication interface. In some embodiments, the communication(s) may include a L3 or lower layer communication according to the OSI model. In order to more efficiently process the communication(s), the reception pipeline may extract, based on the communication interface protocol, communication data encoded therein. The extracted communication data may then be repackaged into a higher layer communication, such as an L4 or L5 or higher layer communication.

In some embodiments, each layer in the OSI model has its own well-defined functions, and the functions of each layer communicate and interact with the layers immediately above and below it, unless the layer does not have layers below or above. In either case, each layer of the OSI model has its own well-defined functions that describe the basic applications for communication of all communication protocols. The higher the layer, the less specific to the communication interface and/or protocol the data is, with L4 introducing data segments of the communication, whereas L3 and below are specific to the networking technology (both physical and as a protocol) and operation thereof. Thus, in some embodiments, the reception pipeline extracts the data segments from the communication(s) to form the communication data.

In some embodiments, the reception pipeline may construct packet data units (PDUs) at the L4 level or higher that package the extracted data segments in an interface agnostic form. For example, in some embodiments, the reception pipeline may use the communication data to construct packet data units (PDU), e.g., according to AUTOSAR-compliant PDUs, according to the transport control protocol (TCP), according to the user datagram protocol (UDP), according to generic routing encapsulation (GRE), or other PDU construction or any combination thereof. As a result, all communications from across multiple interfaces and/or interface types may be converted by the reception pipeline into an L4 or higher layer PDU.

In some embodiments, the universal router 110 may then employ one or more PDU processors and/or PDU routers to apply one or more transformations and routing operations to each PDU. For example, in some embodiments, the universal router 110 may implement a PDU processor and PDU router that is compliant with operation of an AUTOSAR i-PDU router module for routing of AUTOSAR compliant PDUs.

In some embodiments, the universal router 110 may include a rule database that include predefined rules for operations to apply to each PDU. The predefined rules define how each PDU and/or its data payload is to be constructed, extracted, transformed, such as, e.g., data formatting, protocol parameter definition, communication control operation, calculation on the data, or security verification and/or acceleration, or other transformation to the extracted data and/or PDU or any combination thereof. In some embodiments, the universal router 110 may implement rules defining the transformations, e.g., utilizing a PDU processor. In some embodiments, the PDU processor may refer to a physical component (e.g., a processing device as detailed above), or a logical component implemented by a physical processing device. In some embodiments, in the latter configuration, the physical processing device may be shared across the PDU processor, the PDU router, the reception pipeline and/or the transmission pipeline. In some embodiments the rules database can be updated, also by over the air (OTA) update.

In some embodiments, the rule database may include predefined rules that define routing decisions—for each PDU. For example, each PDU may include data indicating a destination and/or a task. The rule database may include routing rules for certain types of data and/or certain destinations, such as, e.g., a next hop, direct routing to the destination, a destination interface, a destination interface protocol and/or interface type, or other routing operation or any combination thereof. The universal router 110 may utilizing a PDU router to implement the rules defining the routing decisions and apply the routing decisions to the associated PDUs. Thus, the universal router 110 may route each communication according to the L4 or higher PDUs constructed from received L3 or lower communications. some embodiments, the PDU router may refer to a physical component (e.g., a processing device as detailed above), or a logical component implemented by a physical processing device. In some embodiments, in the latter configuration, the physical processing device may be shared across the PDU processor, the PDU router, the reception pipeline and/or the transmission pipeline.

In some embodiments, the universal router 110 may be configured to nest and un-nest PDUs inside container PDUs. For example, a received communication may be constructed, by the reception pipeline, as a container PDU having multiple individual PDU segments encoded therein. The universal router 110 may include a PDU container processor that is configured to analyze the container PDU and separate each segment into a separate, discrete PDUs. Additionally, or alternatively, the PDU container processor may be configured to ingest multiple PDUs and combine the PDUs into a single container PDU encoding all of the multiple PDUs therein. In some embodiments, the creation or deconstruction of container PDUs may be defined by rules in the rule database. Thus, the PDU router and/or the PDU processor may interface with the PDU container processor on demand based on whether the rules applicable to a given PDU indicates adding the PDU to a container PDU and/or deconstructing the given PDU, being a container PDU, into multiple discrete PDUs. In some embodiments container PDUs can be compatible with AUTOSAR Container PDUs.

In some embodiments, the PDU router of the universal interface 110 may identify a transmission interface through which a transmitted communication is to be sent to send a PDU. Based on the rules, the PDU router may identify the routing decisions and the appropriate interface and/or interface type and/or communication lane and/or destination for the PDU. The PDU router may then communicate the PDU to the associated communication lane and/or interface of the transmission pipeline in order to effectuate the routing decisions.

In some embodiments, the transmission pipeline may extract the data segments from the PDU to deconstruct the L4 or higher layer PDU. Thus, the transmission pipeline may extract data segments representative of the transformed communication data received by the reception pipeline and processed by the PDU processor. In some embodiments, the transmission pipeline may then reconstruct a lower layer communication from the transformed communication data of the PDU data segments. In some embodiments, the lower layer communication may be an L3 or lower layer communication that is packaged according to the associated interface and/or interface protocol, e.g., based on the lane/interface of the transmission pipeline and/or based on the routing decisions by the PDU router. In some embodiments, the transmission pipeline may then transmit the communication to the next hop and/or the destination via the associated interface in order to deliver the communication.

Accordingly, the universal router 110 may be configured to interoperate with any suitable interface type, receive communications via the interface type, extract communication data and construct a higher layer PDU in order to more efficiently process and route the data, and re-transmit the data of the received communications over the interface type. Thus, the universal router 110 provides L4 or higher layer communication router for any interface and/or protocol associated with the networked ECU 100, thus reducing resource consumption of the networked ECU 100 and improving the speed and efficiency of communication routing for improved latency of vehicle operations. In addition, it can be compatible with current widely used network design tools which are typically based on PDUs for communication processing.

FIG. 2A depicts an exemplary high-level block diagram of universal communication router 110 with any amount of interfaces and interface types. Dataflow may be left to right. In some embodiments, components of the universal router 110 may be integrated into a single chip (ASIC or FPGA). PHY (L1 transceiver) may be standardized per interface type and may also be integrated into the same chip. FIG. 2B illustrates an exemplary high-level block diagram of a universal communication router 110 with 3 types of interfaces—CAN, LIN and Ethernet. In this illustrative example, each interface has its own processing pipeline.

In some embodiments, the inventive solution to the communication performance bottleneck may be a hardware routing engine which may be able to handle all automotive protocols used in modern vehicles, thus creating a universal hardware router 110. In some embodiments, to make a universal design which also supports advanced PDU features (e.g. container PDU) the universal router 110 may include several key stages: a reception pipeline 111, a PDU processor 112, a PDU router 113, a container PDU processor 115, a rule database 114, and a transmission pipeline 116. In some embodiments, the reception pipeline 111 may include an L2/L3 receiver protocol processor 1111*a*, 1111*b* through 1111*n*. In some embodiments, the L2/L3 receiver protocol processor 1111*a*, 1111*b* through 1111*n* may handle the L2/L3 related protocol tasks required to allow for communication with the universal router (e.g. header parsing, handling transmission errors, verifying validity, etc.). The handler may extract the data payload from the frame/packet according to the protocol. In some embodiments, the reception pipeline 111 may include a PDU constructor 1112*a*, 1112*b* through 1112*n*. In some embodiments, the PDU constructor 1112*a*, 1112*b* through 1112*n* may receive payloads from the various protocol handlers and insert them into a PDU construct. The PDU may be either and AUTOSAR compliant PDU format or any other generic PDU format. In some embodiments, the PDU processor 112 may be based on a predefined rule database. Any manipulation on the data or PDU may be carried out in the unit (e.g., data transformation, defining protocol parameters such as priority and flow control, control communication such as routing updates, etc.). In some embodiments, the PDU Router 113 may route processed PDUs to their destination interface based on the routing rules accessed in the rule database 114. In some embodiments, the container PDU processor 115 may include a unit for extracting PDUs from container PDUs and feeding them back to the PDU processor 112 and/or PDU router 113. In some embodiments, the rule database 114 may include a database of rules for processing and routing of PDUs based on, e.g., IDs, header information, data content and on the system state. In some embodiments, the transmission pipeline 116 may include a PDU extractor 1161*a*, 1161*b* through 1161*n* and an L2/L3 transmitter protocol processor 1162*a*, 1162*b* through 1162*n*. In some embodiments, the PDU extractor 1161*a*, 1161*b* through 1161*n* may extract the data payload from the PDUs and all other required information in order to construct the transmitter protocol frame/packet. In some embodiments, the L2/L3 transmitter protocol processor 1162*a*, 1162*b* through 1162*n* may receive the data payload and required information from the PDU extractor in order to generate the transmitter protocol frame/packet and transmit it over the interface.

FIG. 2A depicts an example of a universal router 110. In some embodiments, FIG. 2A depicts the main communication pipeline of the universal router 110. In some embodiments, receiver data may be processed first by the L2/L3 interface specific standardized controllers and if the frame/packet may be valid according to the protocol, the payload may be extracted and also metadata taken from the header of the frame/packet. In some embodiments, there will be a dedicated protocol processor 1111*a*, 1111*b* through 1111*n* per interface, but it may also be consolidated per type of interface (e.g. one for all may be interface). There may be multiple instances of each interface. Protocols may include any and/or all common automotive protocols (e.g. CAN, CAN-HS, CAN-FD, CAN-XL, LIN, Ethernet 100/1000Base-T1, 10Base-T1s and others), discrete signal lines (e.g. GPIO) and other interfaces (e.g. RS232, USB, Firewire, etc.).

In some embodiments, after the interface protocol processor, data may be then transferred to the PDU constructor 1112*a*, 1112*b* through 1112*n*. The PDU constructor 1112*a*, 1112*b* through 1112*n* may be implemented on a per interface basis (for each interface its own PDU constructor), per interface family basis (one for all may be interfaces for instance) or one for all interfaces. This may depend on performance optimization consideration of balancing dataflow against area on chip.

In some embodiments, following the PDU constructor 1112*a*, 1112*b* through 1112*n*, data from all interfaces may be represented in a uniform PDU format which may allow the data to be processed more efficiently and independent of interface type limitations. Processing PDUs may include any operation on the data according to predefined rules (e.g. for a specific PDU ID apply a mathematical formula on some of the values, change the order of data, change the encoding of data, etc.).

In some embodiments, after processing, the PDUs may be sent to a PDU router 113 for routing to the destination interface. In some embodiments, the routing rules in the rule database 114 define for each PDU where to route it. Rules may be based on any parameters and/data in the PDU (e.g. ID, sequence number, data values, timestamp, etc.) and/or on the internal state of the device (e.g. load, throughput, latency, internal state machine, etc.). In some embodiments, the rules are stored in the rule database 114, which may be accessed by the PDU processor 112 and/or the PDU router 113 to decide how to handle each PDU. In other embodiments, the rule database 114 may be split into separate databases for processing and rules, or into several databases. This may be done for performance reasons and/or for memory optimization.

Herein, the term "database" refers to an organized collection of data, stored, accessed or both electronically from a computer system. The rule database 114 may include a database model formed by one or more formal design and modeling techniques. The database model may include, e.g., a navigational database, a hierarchical database, a network database, a graph database, an object database, a relational database, an object-relational database, an entity—relationship database, an enhanced entity—relationship database, a document database, an entity—attribute—value database, a star schema database, or any other suitable database model and combinations thereof. For example, the rule database 114 may include database technology such as, e.g., a centralized or distributed database, decentralized system, server or server system, among other storage systems. In some embodiments, the rule database 114 may, additionally or alternatively, include one or more data storage devices such as, e.g., a hard drive, solid-state drive, flash drive, or other suitable storage device. In some embodiments, the rule database 114 may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The rule database 114 may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the container PDU processor 115 may process container PDUs (e.g., a PDU where several sub-PDUs are packaged together) and may break up the container PDU into the individual PDUs. The container PDU processor may then send back each individual PDU for independent processing by the PDU processor 112. In some embodiments, container PDUs may be standardized by the communication protocol being implemented, e.g., AUTOSAR, and are a common way in automotive to package together multiple data frames inside one large data frame (e.g. for aggregation purposes). In some embodiments, the container PDUs may be used over Ethernet and package together PDUs from lower bandwidth interfaces such as CAN and/or LIN. In addition, the container PDU processor 115 may create container PDUs from multiple processed PDUs, according to the ruleset defined.

In some embodiments, upon the PDU router 113 making a routing decision, the transmission process may be implemented as the reverse of the reception process, where PDUs are deconstructed, the data and metadata extracted and the transmission protocol processor 1161a, 1161b through 1161n may create the frame and/or packet applicable to the destination interface. The resulting frame and/or packet may be sent to the PHY for transition. In some embodiments, data that came in through a particular interface type (e.g. CAN, Ethernet) may be sent out through a same or different interface without any limitation. In some embodiments, the ability to receive data over one interface and transmit the data over a different interface may be the advantage of transforming the communication into a universal representation.

In some embodiments, the selected PDU format may be compatible with one or more particular industry established standards and/or formats depending on the application. This enables the universal router 110 to support design tools available for the particular standard. For example, in some embodiments, the selected PDU format may be compatible with AUTOSAR PDUs. Thus, the universal router 110 may be seamlessly integrated into a standardized AUTOSAR based communication network. Moreover, all tools created to design communication using AUTOSAR standardized protocols may be used and only the resulting router configuration needs to be translated into a compatible ruleset to load into the device. This may be done using automated tools. PDUs sent from a software AUTOSAR PDU router 113, may be seamlessly processed and routed using the inventive device. This makes integration and compatibility significantly higher with current practices, work process and tools in the automotive industry, while providing significantly higher performance by doing all the communication processing in hardware.

In some embodiments, above exemplary embodiment may be implemented in various forms, where some components are joined together into a single component (e.g. processing and routing of PDUs, protocol processor and PDU extractor, combine the receiver and transmitter sides into bidirectional components, etc.), some components may be split further into sub-components (e.g. various types of PDU processors 112), the processing pipeline may be made more parallel by having parallel paths for each interface, or less by consolidating components, the order of the functional units may also vary (e.g. routing prior to processing) and also the functional steps for each interface may be different (e.g. if LIN doesn't require any processing there may be a separate pipeline for LIN bypassing the PDU processor 112). Memory (volatile and non-volatile) may be allocated per functional unit, centrally for all functional units and/or added externally to the device. All such embodiments depend on the system where the inventive device may be integrated and its performance requirements and limitations. The implementation of the inventive device may be purely in ASIC or on FPGA as a single or a collection of cores.

In some embodiments, the protocol processor (in the reception pipeline 111 and/or in the transmission pipeline 116) may be responsible for handling the frame (in case of L2 processing) or packet (in case of L3 processing). In some embodiments, the receiver protocol processor and the transmitter protocol processor for each interface may be separate protocol processors. In some embodiments, the receiver protocol processor and the transmitter protocol processor may be combined into a protocol transceiver for each interface. In some embodiments, this may be implemented by a standardized controller for the relevant interface. For example, in case of CAN, the protocol transceiver may be implemented by a standard and certified controller cores (e.g. Bosch CAN cores, Fraunhofer CAN cores), the same in case of LIN (e.g. CAST LIN cores). In case of Ethernet a standard L2 cores may be used (e.g. Cadence Ethernet MAC cores) and a L3 wrapper added to handle the cores packet (e.g. Packet Architects AB Router core, or a custom solution which implements the standardized layer). Such controller may be responsible for checking the validity of the frame/packet received based on the communication protocol (e.g. may be frame CRC, cores packet header validity and CRC, etc.). In some embodiments, during transmission the controller may be responsible for generating a valid frame/packet to go on the wire based on the data payload and header metadata provided. After the frame/packet may be received properly, the protocol processor shall send the data payload and the header data to PDU constructor. Another embodiment may have the protocol processor deliver the frame/packet as may be after receiving it and checking it, and the PDU constructor will extract the data based on the header and payload.

In some embodiments, after the frame/packet is received and verified it may be decomposed into its data payload and its metadata contained typically in the header by the PDU constructor of the reception pipeline 111. The payload may be wrapped in the PDU data structure. An exemplary such structure may be the standard AUTOSAR PDU format, however any other standardized format may be used, such as TCP, UDP, GRE, or others or any combination thereof. In some embodiments, to header data coupled with the receiving interface are used in order to create the PDU header (e.g. PDU header may be contain parameters such as PDU ID, PDU Length, PDU sequence number, status flags, PDU CRC, etc.). The rules may be either stored in each PDU constructor/extractor or in the centralized rule database 114 (e.g. packet from interface XXX will be assigned PDU ID YYY). The data that may be used in order to create the PDU header may be include the frame/packet header and footer, data in the payload, physical interface on which the packet/frame were received/will be sent. In another embodiment PDUs may be received already inside the frame/packet as payload. In this case the PDU constructor may be just forward the payload to the PDU processor 112 without doing anything. This exemplary situation may happen in an AUTOSAR environment where the AUTOSAR PDU router 113 may be sending AUTOSAR PDUs over various interfaces such as CAN, LIN, ETH, etc. The same may be happen with the PDU extractor in the transmission pipeline 116 where the data payload may be the received PDU, and forwarded to the protocol processor as is. This may be also directed by the ruleset.

In some embodiments, the PDU processor 112 provides the capability to have processing logic on PDUs and their payload. Exemplary operations may be mathematical operation on the data payload or parts of it, reordering of the data, encoding/decoding of the data, etc. The PDU header may also be modified, among other transformations and/or manipulations. In some embodiments, the PDU processor 112 may provide the ability to manipulate the PDU using predefined logic. To decide which operation to do on which PDU, the rule database 114 may be used based on the PDU header parameters (e.g. PDU ID) and PDU payload. The PDU processor 112 may be also contain capabilities such as security inspection of the PDUs (e.g. IDPS, deep packet inspection, etc.), cryptographic processing on the payload (e.g. encryption, decryption, cryptographic signature, etc.).

In some embodiments, the PDU router 113 routes PDUs to the appropriate destination interface based on the routing ruleset. The PDU router 113 may use the PDU header, payload and/or current state (e.g. internal state machine, current throughput, current latency, current load on the device, etc.) to decide (based on the applicable routing rules) to which interface to route the PDU. In some embodiments, the PDU router 113 may have a single routing instance or use several parallel routers to improve bandwidth and PDU processing. In some embodiments, the PDU router 113 may be also include security functionality such as firewalling, whitelist and/or blacklist of PDU IDs, protocol inspection, etc.

In some embodiments, the container PDUs (such as those defined in AUTOSAR PDU Specifications, or according to other suitable data unit definitions of one or more other transport protocols) are PDUs which include a collection of PDUs as payload. Thus, in order to properly process the container PDU, each contained PDU may be extracted and processed independently. In some embodiments, the container PDU processor 115 may be used in order to decompose container PDUs (as identified by their PDU ID) and send back each contained PDU for independent processing back with the PDU processor 112. In some embodiments, the container PDU processor 115 may be connected to the PDU router 113, since the ruleset may define that certain container PDUs are routed as is and not decomposed into individual PDUs. Thus, the PDU router 113, based on the ruleset, may decide where to send these PDUs. In some embodiments, the container PDU processor 115 may build container PDUs. The PDU router 113 may route the contained PDU to the container PDU processor 115 where each PDU may be aggregated until the full container PDU is built. In some embodiments, the PDU router 113 may use the ruleset to define which PDUs make up a container PDU. The ruleset may be stored either locally inside the container PDU processor 115 or in an external database such as the rule database 114. In some embodiments, container PDU decomposition and construction may be a cyclic process where decomposed PDUs are themselves container PDUs and also where container PDUs are inserted into larger container PDUs.

In some embodiments, the rule database 114 may include at least rules that enable the processing and routing of all the PDUs in the system. The database may be singular and thus storing all the rules in one location, or distributed over several databases. In some embodiments, the rule database 114 may include additional rules which are used by each functional unit in order to facilitate its activity as described above. In some embodiments, each functional unit may have a respective database including the PDU processor 112 and PDU router 113. Nonetheless, PDU processing and routing rules must be stored somewhere in the system. The database may be stored in ROM, or in writable Flash so it may be changed or loaded into RAM (on chip or off chip) for quicker access. In some embodiments, the rules may be represented in any machine readable format, including an array of rules for each PDU ID. In some embodiments, the rule database 114 may be searchable and may be implemented, e.g., as a hash table where the key may be the PDU ID, and the result may be a linked list containing all the related rulesets for this PDU ID (each may be an array as an exemplary implementation). Any other suitable database schema may be employed, such as a relational database, hierarchical database, etc. as detailed above. For example, any data structure may be used including linked lists directly, dictionary, flat array, multi-dimensional array, etc. In some embodiments, the logical representation of the rules and how to store the rules in searchable way may be dependent on the required performance (the longer the search the higher the resulting processing latency will be) and the available memory (faster data structures usually require more memory).

In addition to the above functional units, peripheral functional units may be added based on the specific requirements of each application. For example, built in self-test (BIST) for all functional components, diagnostics for performance and errors in operation, configuration of the various components, security capabilities (e.g. secure load of configuration data, secure storage, anti-tampering, etc.), safety capabilities (e.g. redundancy in functional units and interfaces, watch dogs, integrity checkers, etc.). The components outlined in FIGS. 2A and 2B provide a high-level exemplary embodiment of the inventive device, however common peripheral device in vehicle electronics design may be added to the design.

Example Universal Router 310

Figure 3A:
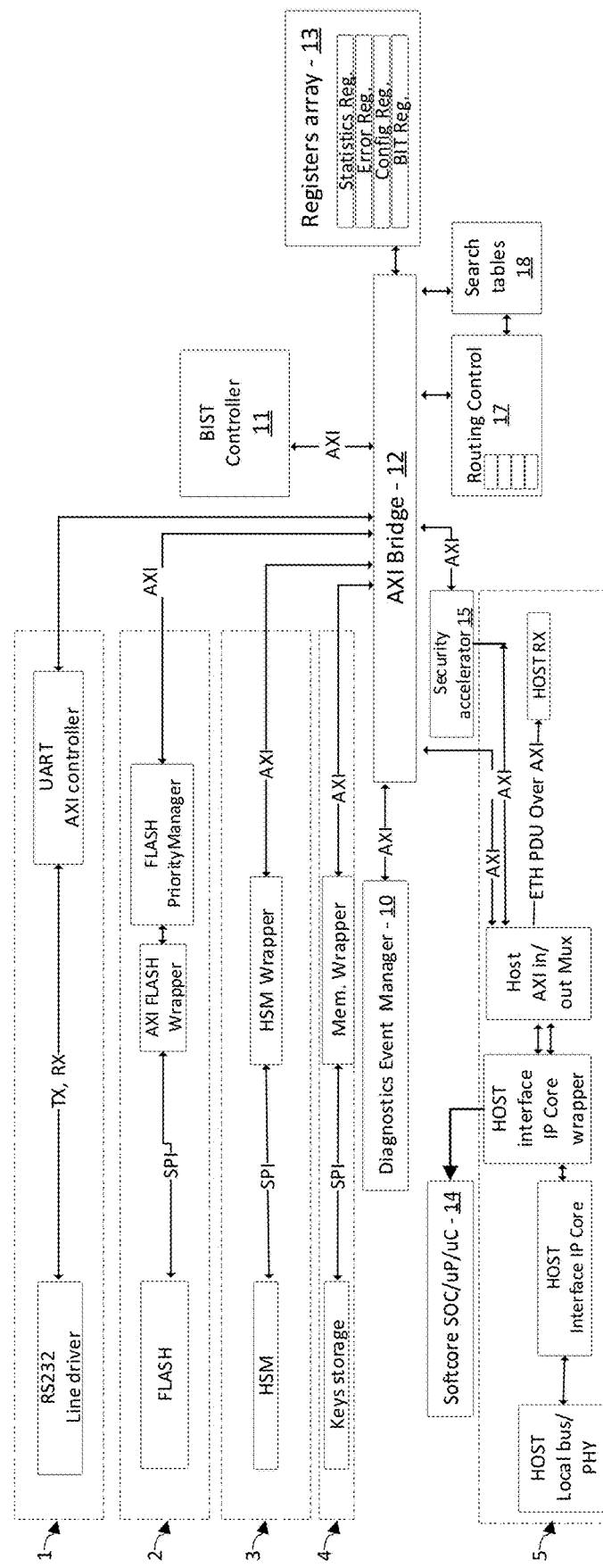
FIG. 3A and FIG. 3B depict an exemplary detailed block diagram of a universal L5 communication router on a single chip in accordance with one or more embodiments of the present disclosure.
Figure 3B:
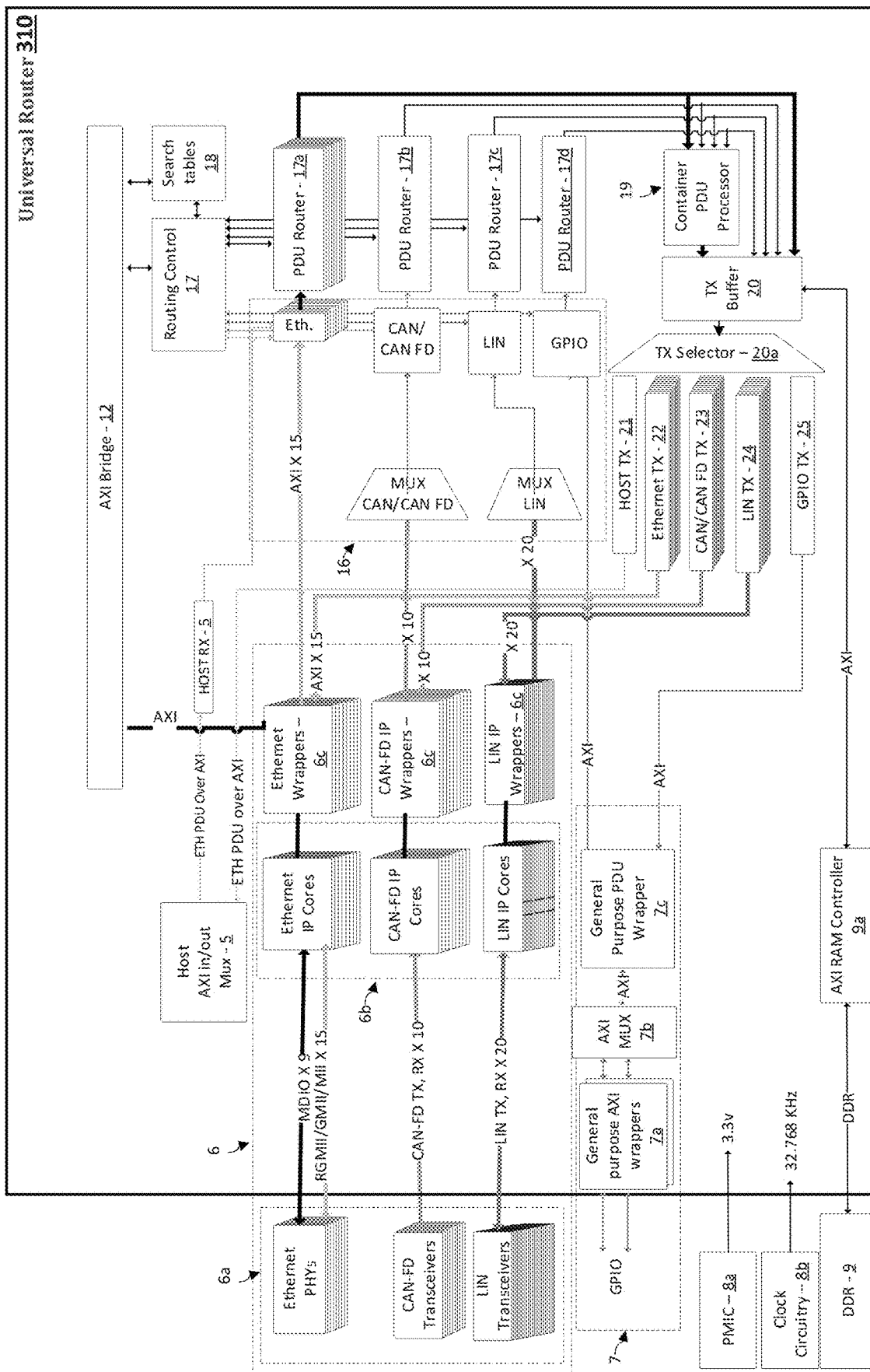

FIG. 3A and FIG. 3B depict an exemplary detailed block diagram of an example of a universal L5 communication router 312 on a single chip. The implementation includes various processing capabilities which are adapted to modern vehicle ECU requirements. An exemplary single chip solution (wither ASIC or PFGA). PHY (L1 transceivers) 6, FLASH memory 2, RAM 9, secure storage 4, HSM 3, power supply 8a and clock generation 8b are external to the single chip solution, but may be integrated internally as well in other exemplary solutions.

In some embodiments, the illustrative universal router 310 may include a universal asynchronous receiver-transmitter (UART) interface 1, e.g., over RS232 1, RS-485, or other standard and/or universal or non-universal asynchronous receiver and/or transmitter. In some embodiments, a UART interface may be added over RS232 serial to allow for debugging and configuration of the inventive device during development and in a laboratory environment (depot level maintenance). The interface may be connected directly into the main AXI interconnect of the inventive device in order to allow it access to all sub-systems. In some embodiments, the RS232 1 UART is not related to the processing and routing pipeline for in-vehicle communications, nor does it have to operate with PDUs. In some embodiments, the RS232 1 interface may be inline and connected to the main communication pipeline. In some embodiments, the interface may include a physical layer chip (PHY), such as, e.g., L1 RS232 transceiver or other suitable L1 layer transmission medium (line driver, e.g. TI SN65C3221-Q1) connected to an cores core which converts UART over RS232 into UART over advanced extensible interface (AXI) for internal communication inside the chip which may be based on AXI in this exemplary embodiment. In some embodiments, other on-chip protocols may be employed, such as Wishbone or others. may be employed based on the cores core such as Xilinx AXI UART Lite, or an ARM, x86, PowerPC, McoresS, RISC-V, etc.

In some embodiments, the illustrative universal router 310 may include External Flash Memory 2. In some embodiments, the flash memory 2 may be external to the universal router 310 chip in this exemplary embodiment (e.g. Micron MT25Q). Flash memory stores the configuration, rules DB and other non-volatile data (e.g. software in case there may be a softcore microcontroller or microprocessor) while the device may be off. When the device powers on it loads all the required data from the flash memory 2 into internal or external operational memory (e.g. RAM, ROM, mSATA, m.2, etc.). In some embodiments, there may be translator between Flash memory interface (e.g. SPI) into the on-chip communication protocol (e.g., AXI or other). In addition, there may be a priority manager in order to facilitate multiple entities trying to reach the memory (e.g. while the configuration may be loaded, an internal component want to write data to the Flash memory 2). The priority manager may be implemented as a simple selector based on the on-chip communication protocol address which determines which data may be sent first to the flash memory 2 and which may be stored for later processing in a built-in queue. In some embodiments, the priority manager may be more complex and advanced in other embodiments such as prioritizing based on data being sent (and not only address) and any other parameter. In some embodiments, there may be multiple Flash memory 2 modules, which may be external and internal (on chip). The number of external and/or internal flash memory 2 modules may be based on the cores core such as iWave Systems Technologies NAND Flash Controller.

In some embodiments, the illustrative universal router 310 may include an External HSM (Hardware Security Module) 3. In some embodiments, modern automotive architecture may be designed to maximize cyber security. In modern automotive networking there are several secure communication protocols (e.g. TLS, AUTOSAR SecOC, etc.) Such protocols may utilize hardware accelerators for increased performance and secure storage for cryptographic data. In some embodiments, such functions are implemented by an external commercial HSM (e.g. ETAS CycurHSM, Infineon AURIX HSM, etc.). In some embodiments, the interface to such external HSM may be mediated by an on-chip communication protocol wrapper which translates between the HSM communication protocol (e.g. SPI, I2C, UART, etc.) into the on chip on-chip communication protocol. In some embodiments, some of the function or an entire HSM may be implemented on chip. In some embodiments, the on-chip communication protocol wrapper may be based on a standard cores core such as Xilinx on-chip communication protocol Quad SPI.

In some embodiments, the illustrative universal router 310 may include an External Cryptographic Key Storage 4. In some embodiments, an external HSM may not be used, and a dedicated memory may be used in order to store cryptographic data. Such memory may be only connected to the inventive device through a dedicated interface (to prevent cryptographic data sent/received to/from the wrong location. An exemplary interface to such memory may be SPI (in other implementation may be any other standard memory interface such as QSPI, USB, UART, etc.). In this case also there may be a wrapper which translated the memory interface into on chip on-chip communication protocol. In some embodiments, such memory may be also reside on chip. In some embodiments, the on-chip communication protocol wrapper may be based on the cores core such as Xilinx on-chip communication protocol Quad SPI.

In some embodiments, the illustrative universal router 310 may include a HOST communication pipeline 5. In some embodiments, the universal router 310 may be in communication with a HOST, e.g., an internal or external microcontroller (uC) and/or microprocessor running software (e.g. AUTOSAR). In some embodiments, both are present. In some embodiments, the HOST communication pipeline supports both internal and external HOSTs. In some embodiments, the external and internal HOST interface may be Ethernet. An on-chip communication protocol Ethernet L2 controller may be any custom or off-the-shelf controller, such as, for example, a commercial Xilinx on-chip communication protocol 1G/2.5G Ethernet Subsystem, or any other IEEE 802.3 compliant controller. In some embodiments, the interface wrapper cores may provide additional functionality such as handling standardized cores addressing, conversion of communication into PDUs (in the same manner as the main communication pipeline wrappers) and any other functionality. In some embodiments, the HOST multiplexer (Mux) may provide the capability to control which HOST may be being currently communication with. Accordingly, in some embodiments, in case there are several HOSTs, the HOST Mux may provide a form of internal on-chip communication protocol addressing. HOST traffic in such embodiments may be handled outside of the main communication pipeline to allow for the universal router 310 to offload advanced software only high-level function to a microprocessor and/or microcontroller. In some embodiments, this may be implemented directly in the hardware pipeline. In another embodiment, a dedicated interface may not be required and the HOST may be connected directly to inline to the main communication pipeline interface (both internal and external hosts). By having a dedicated interface, the main communication pipeline control logic may be simplified while allowing for more flexibility specifically for the HOST interface. In some embodiments, the external Ethernet PHY may be based on a custom and/or off-the-shelf Ethernet PHY, such as, for example, Marvell Brightlane Ethernet PHY.

In some embodiments, the illustrative universal router 310 may include a Main Communication Pipeline 6a through 6c. In some embodiments, the main communication pipeline may be the core of the universal router 310. The main communication pipeline may include the reception, processing, routing and transmission components described above in FIGS. 2A and 2B. In some embodiments, each Ethernet interface may receive a dedicated instance of the pipeline, e.g., for performance reasons as Ethernet may be a high bandwidth interface. In some embodiments, the L2 processing cores core (protocol processor) and PDU constructor (wrapper) are per interface for all interfaces. In some embodiments, the CAN, LIN and GPIO interfaces and may be consolidated into a single router per interface type because CAN, LIN and GPIO are low bandwidth interfaces. In other embodiment the L2 processing may be consolidated into one or more cores per interface type, so may be the wrapper and PDU router.

In some embodiments, the main communication pipeline may include PHYs 6a. The PHYs 6a are the L1 implementation of the communication interfaces in the main communication pipeline. In some embodiments, there may be up to 15 Ethernet interfaces or more (e.g., 1, 2, 3, 4, 5, 6, 7, 8, 9, 10, 11, 12, 13, 14, 15 or more), up to 10 CAN-FD interfaces or more (e.g., 1, 2, 3, 4, 5, 6, 7, 8, 9, 10 or more), up to 20 LIN interfaces or more (e.g., 1, 2, 3, 4, 5, 6, 7, 8, 9, 10, 11, 12, 13, 14, 15, 16, 17, 18, 19, 20 or more), and/or up to 2 GPIO interfaces or more (e.g., 1, 2 or more) in the main communication pipeline. In some embodiments, the PHYs 6a may be commercial standardized components. For example, Ethernet PHYs may be based on Marvell Brightlane Ethernet PHY, while CAN-FD Transceivers (PHYs) may be based on NXP TJA1042T, and LIN Transceivers may be based on NXP TJA1020. Other commercial and/or custom solutions may be employed.

In some embodiments, the main communication pipeline may include respective L2 cores 6b. In some embodiments, the L2 cores 6b may be implementing the inventive protocol processors described in FIGS. 2A and 2B above. In some embodiments, the L2 cores 6b may be bi-directional so the same ones may be used for both transmitter and receiver communication. In some embodiments, the L2 cores 6b may be based on commercially available controller cores for the respective interfaces. For example, Ethernet controller may be based on Xilinx on-chip communication protocol 1G/2.5G Ethernet Subsystem or any other controller compliant with IEEE 802.3, while CAN-FD controllers may be based on Xilinx FD cores, or any other controller compliant with ISO 11898-1/2015, and LIN controllers may be based on CAST LIN Bus Master/Slave Controller cores or any other controller compliant with ISO 17987.

Figure 4:
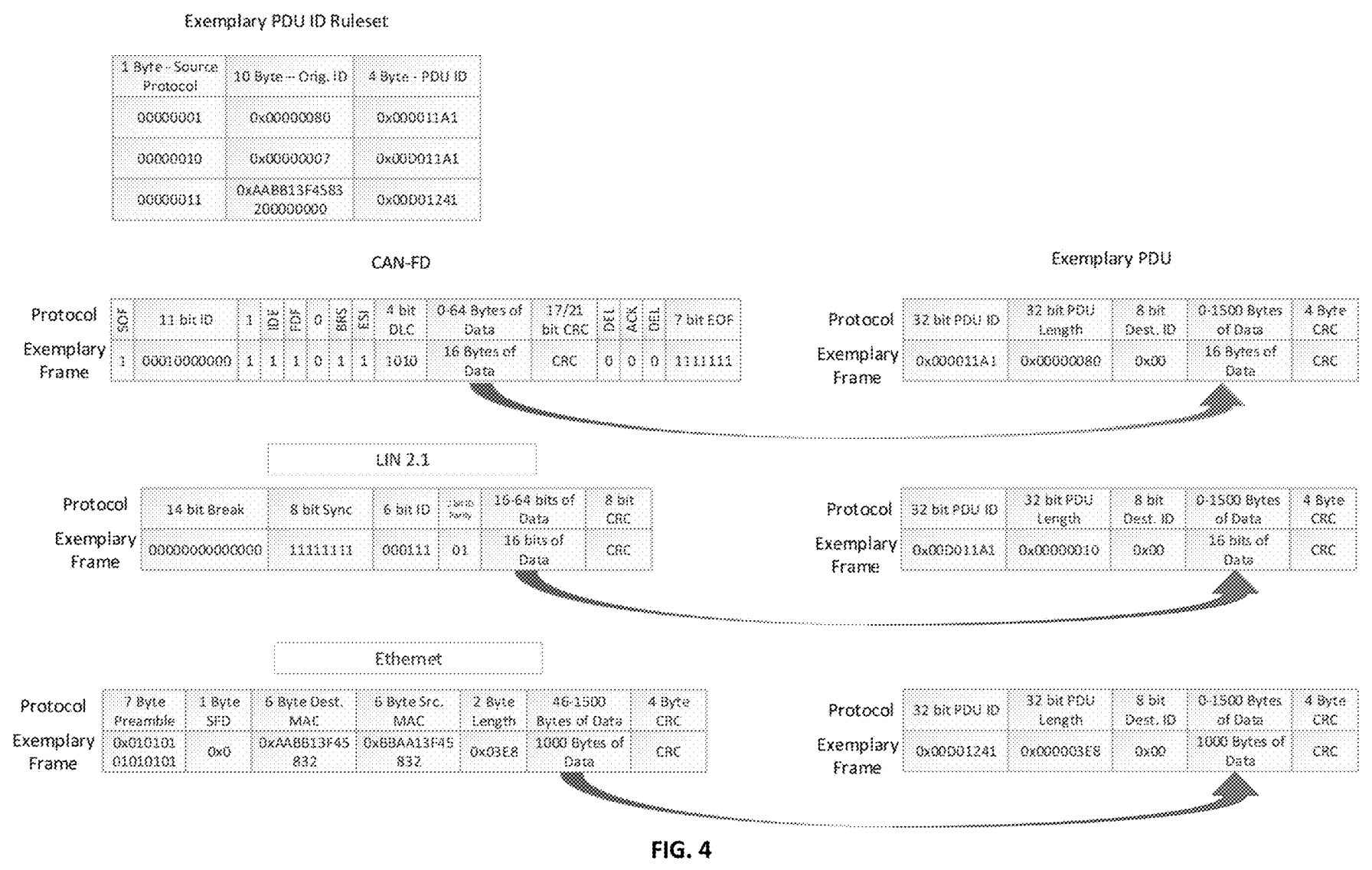

In some embodiments, the main communication pipeline may include wrappers 6c for each communication protocol. In some embodiments, the wrappers 6c may be responsible for extracting the data payload from each protocol frame, constructing a PDU which contains the data payload and sending the PDU over on-chip communication protocol to the PDU section of the communication pipeline. In some embodiments, the wrappers 6c are an exemplary implementation of the PDU constructors from FIGS. 2A and 2B. In some embodiments, the rules of packing communication into PDUs may be governed by the Routing Control module where the ruleset may be stored in the Search Tables. The search tables may provide an exemplary implementation of the Rules DB from FIGS. 2A and 2B. FIG. 4 below depicts an exemplary PDU construction process.

In some embodiments, the illustrative universal router 310 may include GPIO interfaces 7. In some embodiments, the GPIO interfaces 7 may be based on standard on-chip GPIO 1.8v/3.3v/5v pins, and thus can operate without a transceiver. In some embodiments, the GPIO interfaces 7 may be implement any custom interface such as PWM, A/D, Analog, etc. In some embodiments, the GPIO to on-chip communication protocol wrapper may be implemented using a standard commercial cores core such as Xilinx on-chip communication protocol General Purpose 10. Since GPIO are independent discrete communication, the GPIO interfaces 7 may be synchronized through a standard on-chip communication protocol Mux which controls which particular on-chip communication protocol interface may be currently accessed. The on-chip communication protocol Mux may be implemented using a commercial cores such as Xilinx on-chip communication protocol4-Stream Interconnect, which may be an exemplary implementation of the protocol processor described in FIGS. 2A and 2B for GPIO.

In some embodiments, the signal received through the GPIO interface 7 (in this exemplary embodiment, each interface may be only represent a logical "1" or logical "0", but in other embodiments may be any data) may be packed into a PDU based on the ruleset as with the other interfaces. In some embodiments, the PDU may be constructed based on the PIN through which the signal was received through, the signal value and other system parameters (e.g. voltage, clock, etc.).

In some embodiments, the illustrative universal router 310 may include a PMIC and Clock 8. In a real-world environment, the universal router 310 may be supplied with power and the system clock in order to operate in the target ECU. Depending on the way the chip may be designed, the voltage levels are supplied by a PMIC (Power Management IC). In some embodiments, the entire chip may operate at, e.g., 3.3v, and thus, a 3.3v channel PMIC may be employed. The PMIC and clock 8 may be based on a commercial product such as On Semi NCV97200. In some embodiments, the Clock may be received from an external device or even the HOST. In some embodiments, the universal router 310 may utilize a 32.768 KHz clock generated by a custom or commercial oscillator such as NDK NZ2016SHA.

In some embodiments, the illustrative universal router 310 may include RAM 9. In some embodiments, the universal router 310 may utilize external RAM to increase the amount of available system memory for operation. RAM may be used to store rulesets, configuration parameters, communication for processing (used as PDU queue, or protocol packet/frame queue) or operational data used by the device. External RAM may be used when the internal RAM is insufficient for the required data to be stored. In some embodiments, all RAM may be internal and/or external. In some embodiments, the exemplary external RAM used may be DDR RAM such as commercial such as ISSI IS46R83200F. In order for the system to access the RAM through on-chip communication protocol a RAM controller 9a may be used such as a DDR1, DDR2, DDR3, DDR4, DDR5, DDR6, LP-DDR1, LP-DDR2, LP-DDR3, LP-DDR4, LP-DDR5, LP-DDR6, GDDR1, GDDR2, GDDR3, GDDR4, GDDR5, GDDR6 or other DDR RAM controller or any combination thereof. An example of a DDR4 controller may include, e.g., a Xilinx DDR4 Controller cores. In this exemplary embodiment the external RAM may be used only to extend the internal transmitter buffer PDU message queue in case it fills up with PDUs to be sent.

In some embodiments, the diagnostics event manager 10 may be responsible for generating diagnostics event according to automotive specifications. Diagnostics may be part of automotive systems. Diagnostics may be used in the development/lab environment to debug faults, or during operation so the system may be report any problems. A standardized diagnostics L5 message format in automotive may be DoIP (Diagnostics over IP, standardized in AUTOSAR). This format generates diagnostics messages over cores based on specific protocols used in AUTOSAR. In some embodiments, the exemplary embodiment uses standard DoIP protocol to report diagnostics events over cores. In some embodiments, the diagnostics event manager collects diagnostics related data from the system (e.g. failed BIST, overfilled queue, no more free RAM, PHY may be malfunctioning, etc.) and packages the diagnostics related data into a diagnostics PDU containing a DoIP message. In some embodiments, the diagnostics event manager 10 may then send the DoIP message through an on-chip communication protocol to the PDU router. In some embodiments, the diagnostics event manager 10 may be inline in the main communication pipeline. In some embodiments, the diagnostics event manager 10 may be external to the universal router 310. In another embodiment the diagnostics protocol may be any other custom protocol and communication may be bypass the PDU pipeline and be based entirely on a custom format or directly on on-chip communication protocol.

In some embodiments, the illustrative universal router 310 may include a Built In Self Test (BIST) Controller 11. In some embodiments, the BIST controller 11 may implement a BIST, which may be a standard practice for every automotive electronic device. To provide compliance with quality and safety standards, each automotive device must perform a BIST at least as startup and in some cases during operation. In some embodiments, the BIST controller 11 may receive data from various components of the device regarding any error or problem states. In some embodiments, the BIST controller 11 may report a problem it detects in all supporting sub-systems. In some embodiments, the BIST controller 11 may actively monitor the performance of the sub-systems and predict possible errors/malfunctions prior to them happening. Not all sub-systems may be supported or be relevant for BIST. For example, communication controllers (L2) typically contain BIST capabilities, while PHYs are typically simpler devices which do not contain BIST capabilities. An example of a BIST would be testing all controller cores in the system prior to boot, testing that there may be a link on all Ethernet interfaces (as per IEEE 802.2). Tests during operation may include testing that queues are not full or receiving a signal when a certain queue may be full and can't accept any additional communication (e.g. RAM may be full). In some embodiments, once the BIST controller 11 detects a fault, the BIST controller 11 may raise a fault bit and generate a fault code based on a predefined list of fault conditions. The BIST controller 11 may then transmit the fault code to the Diagnostics Event Manager 10 where the fault code may be transmitted over DoIP. An example fault code may be 0x256A (hexadecimal) which may correlate to transmitter queue full. In some embodiments, the BIST controller 11 may be integrated with the Diagnostics Event Manager 10 into one module. In other embodiments, the BIST controller 11 may be communicate using PDUs and not directly on on-chip communication protocol. In some embodiments, the BIST controller 11 may be in-line to the main communication pipeline and connected to one of the communication interfaces.

In some embodiments, the illustrative universal router 310 may include an on-chip communication protocol Bridge 12. In some embodiments, the bridge 12 may be an on-chip communication protocol switch which may be able to switch on-chip communication protocol data frames in between various interfaces on chip. In some embodiments, the on-chip communication protocol may be a star architecture protocol, which may utilize a central component for switching. The central component for switching may be a standard component in on-chip communication protocol based chips and may be implemented using, e.g., Xilinx AXI AMM Bridge cores or Intel AXI Bridge cores or other on-chip communication protocol bridge cores.

In some embodiments, the illustrative universal router 310 may include a Registers Array 13. In some embodiments, the registers array 13 may be an internal memory array used for configuration and status parameters of the device. In some embodiments, the registers array 13 may be based on built in on-chip memory or utilize any external memory. In some embodiments, the registers array 13 may utilize on-chip RAM accessed directly through the on-chip communication protocol bus. In some embodiments, the RAM may be implemented using commercial cores such as Xilinx Block Memory Generator coupled with Xilinx on-chip communication protocol Block RAM (BRAM) Controller which implements on-chip communication protocol access. In some embodiments, the registers array 13 may be store the following data: statistics data (analysis of throughput, latency and performance parameters of the communication pipeline), error data (e.g. error codes detected in the system by the BIST), configuration (e.g. logical addresses of interfaces, logical sizes of queues, etc.), BIT registers (e.g. synthetic data to use for BIT execution, result data of BIT execution prior to verification, etc.) and others. In some embodiments, some or all operational data except for the ruleset used by the communication pipeline may be stored here. In some embodiments, the register array 13 may be split into multiple arrays in various locations and also each sub-system may be store its own array without a centralized one.

In some embodiments, the illustrative universal router 310 may include a Softcore SOC/microcontroller/microprocessor ("processor") 14. In some embodiments, although the universal router 310 may implement many of the functions that are done in software, there may still be advanced high level functionality which may be too costly to implement in hardware. In some embodiments, the processor 14 may be used, not for high-speed routing, but rather for special protocols and configuration (e.g. AUTOSAR Service Discovery, AUTOSAR Network Management, etc.) and thus may not be subject to strict timing and performance requirements. Nor does the processor 14 scale with the speed and amount of interfaces in the universal router 310. In some embodiments, the aforementioned functionality may be executed via software run on the processor 14 in order to work. Such a processor 14 may be the HOST. In some embodiments, there may be external hosts (as defined in sub-system 5) and/or internal HOSTs such as softcore SOCs, microcontrollers or microprocessors. One example of such solution may be Xilinx Microblaze which may be a softcore microcontroller of various sizes and complexities. Another example may be an ARM A64 microprocessor or any other suitable processor solution.

In some embodiments, the illustrative universal router 310 may include a Security Accelerator 15. In some embodiments, as described in component 3, security capabilities may be an important part of a modern automotive system. An integral part of cryptographic acceleration may be achieved either through external components such as an HSM, or internal components. In some embodiments, the security accelerator 15 may be used to accelerate encryption/decryption of standard automotive protocols such as TLS, SecOC, etc. Cryptographic material storage may be done externally in an HSM or dedicated memory (components 3 and 4) but in another embodiment may be done internally as well in this component. Crypto acceleration may be implemented using standard cores such as Silex Crypto Coprocessors cores (BA450, BA456, BA457). In addition, the security accelerator 15 may be used in order to decrypt (or cryptographically verify) the data loaded from Flash during boot in order to verify its authenticity and integrity. In addition, the security accelerator 15 may be used to encrypt and/or cryptographically sign data saved in External or internal memory.

In some embodiments, the illustrative universal router 310 may include receiver Queues 16. In some embodiments, the universal router 310 may omit an explicit PDU processor. Instead, in some embodiments, PDU level processing may be done individually per interface on the level of the interface wrapper and/or integrated into the PDU router. When PDUs are constructed by the wrapper, they are moved into individual queues awaiting the processing by the PDU routers 17. For example, Ethernet may have one queue per interface since it may be a high bandwidth interface, and the other interfaces may have a single queue per interface type due to lower bandwidth. In some embodiments, the queue per interface arrangement may be changed to any number of queues per any interface type to balance area with performance optimization. Because there may be only one queue per interface type in CAN, LIN and GPIO there may be a selection Mux which may be controlled by the Routing Control module 17, and the routing control module 17 may select which specific interface to handle at any given time. Such configuration may also allow for flow control, traffic shaping and quality of service as the Routing Control may be decide on the order of handling for the interfaces.

In some embodiments, the illustrative universal router 310 may include a PDU router(s) 17*a*, 17*b*, 17*c*, 17*d*. In some embodiments, the PDU router(s) 17*a* through 17*d* may be using the routing rules in order to mark the various incoming PDUs with the destination interface through which they need to be sent. In some embodiments, the Routing Control module 17 may perform two main functions: prioritization of interface queues towards the router and making routing decisions. In some embodiments, prioritization may include using a standard round robin protocol between all the interface queues. In some embodiments, prioritization may be according to QoS (Quality of Service) data in the original protocol (e.g. 802.1Q for Ethernet, TSN prioritization), predefined priorities by the developer or any other priority scheme (e.g. weighted round robin, stochastic fairness queuing, etc.). In some embodiments, the Routing Control controls the MUXs of the interface queues according to the priority scheme. Routing decision may be made based on the routing ruleset. In some embodiments, the routing rules are stored search tables (which are the exemplary implementation of the rules DB from FIGS. 2A and 2B). In some embodiments, the Routing Control searches for the appropriate routing rule based on the PDU ID field in the PDU header. Once the routing control finds the relevant rule, the routing control may tag the PDU which may be then forwarded to the appropriate transmitter queue. In some embodiments, the tagging may be done by the PDU router(s) 17*a* through 17*d* itself according to control from Routing Control. In some embodiments, routing decisions may be made according to one or more parameters such as source interface, data payload, system state, etc. An exemplary implementation of PDU tagging may be having a destination (DST) field in the PDU header (as shown in FIG. 4) which may be filled out by the PDU router(s) 17*a* through 17*d* based on the Routing Control routing decision. Other embodiments may be include adding a tag to the payload or creating a custom frame which contain the tag and the PDU and other common frame/packet tagging techniques in networking. In some embodiments, the universal router 310 may separate Routing Control from the PDU router(s) 17*a* through 17*d* to enable a higher degree of parallel processing. In some embodiments, when the PDU is transmitted from the protocol wrapper over an on-chip communication protocol it may be done in serial when the header may be transmitted first. While the rest of the PDU may be transmitted, the header may be routed to Routing Control for processing. While the PDU router(s) 17*a* through 17*d* may be writing the PDU into the transmitter Buffer (or PDU Container Processor), Routing Control may be making routing decisions based on the header and signaling the PDU router(s) 17*a* through 17*d* which value to write in the PDU header in the transmitter Buffer. In some embodiments, using this method the pipeline enables routing decisions to be made in parallel with no impact to processing latency. In some embodiments, the two units may be consolidated into one. In addition, any amount of PDU routers 17 may be implemented depending on optimization of area on chip vs. performance.

In some embodiments, the illustrative universal router 310 may include Search Tables 18. In some embodiments, the search tables 18 may store the main ruleset in this exemplary embodiment. In some embodiments, the tables are connected to the main communication switch 12 in order to be updated, including externally triggered updates OTA. In some embodiments, the PDU processing may be contained within the individual wrappers, thus no processing rules are required. Priority scheduling may be in round robin so no priority data may be required. In some embodiments, the processing rules, priority rules and any other rules impacting PDU scheduling and/or routing may be stored in the search tables 18 (or Rules DB as depicted in FIGS. 2A and 2B). In some embodiments, the routing rules are stored in a database format where the PDU ID may be the entry key and the entry includes the rules for this specific PDU ID. In some embodiments, the data structure used for searching may be a hash table because hash tables enable fast searching (in other embodiments any structure may be work including dictionary, linked list, array, etc.). Therefore, in some embodiments, once the key is found the hash table contains a pointer to a linked list of rules for this particular PDU ID (in other embodiments the rules may be stored in any other data structure such as array, stack, queue, etc.). In some embodiments, there may be multiple rules per PDU ID in case the routing decision depends on other parameters such as current load on the device, current load on the particular PDU router, time, sequence number, data payload inside PDU etc. In some embodiments, once the appropriate rule is selected, the destination interface may be sent back to the PDU Router where it may be written into the PDU header in the transmitter buffer.

In some embodiments, the illustrative universal router 310 may include a Container PDU Processor 19. In some embodiments, the Container PDU Processor may be another destination a PDU may be reach before the transmitter Buffer (using its own destination tag). Once a PDU ID may be identified as a container PDU, the PDU may be decomposed into the contained PDUs and sent back for processing in the receiver pipeline. In some embodiments, the Container PDU Processor strips the PDU header and extract all PDUs contained in the payload. In some embodiments, to identify all PDUs in the payload, before each PDU there may be a descriptor which states the length of the PDU after it, where the descriptor may be a fixed length (one byte in an illustrative embodiment, where it represent the size in bytes of the PDU after it, making the maximal PDU size to be 256 bytes). However, other lengths may be employed, e.g., in a range of 1 to 24 bytes. Any length may be selected in other embodiments. In some embodiments, the Container PDU Processor processes each container PDU in series going through the PDU contained one by one according to their length and sending them back into the receiver queue, until the container PDU may be fully processed (based on its own length stated in its header). It assigns each contained PDU a unique tag (e.g. 0xFF) so that the transmitter selector knows to send it back to processing in the receiver queue.

In some embodiments, the illustrative universal router 310 may include transmitter Queues. In some embodiments, the transmitter part of the pipeline may include two modules; one common queue for all transmitter PDUs and a transmitter selector MUX 20*a* based on the destination tag in the PDU header. In some embodiments, the transmitter selector 20*a* goes through all the PDUs in the transmitter buffer 20 one by one in FIFO order (in other embodiments, any other prioritization scheme may be used) and transfers the PDUs based on the header into the relevant interface transmitter queue, e.g., a HOST transmitter 21, an Ethernet transmitter 22, a CAN/CAN FD transmitter 23, a LIN transmitter 24 and/or a GPIO transmitter 25. In some embodiments, the individual transmitter queues 21 through 25 may be also grouped together per interface type or not used altogether (the transmitter Selector 20*a* will transfer the data directly to the relevant interface wrapper). In some embodiments, there may be a separate queue per interface and this per wrapper in order to allow for buffering for the bidirectional wrappers. In some embodiments, because the wrappers (which provide PDU extraction capabilities) may be shared between receiver and transmitter, the transmitter interface queues 21 through 25 may provide a buffer in case the wrapper may be busy with PDU construction for incoming traffic. Each wrapper may receive transmitter data from its respective transmitter queue 21 through 25 (for instance in round robin fashion between receiver and transmitter traffic), and extracts the PDU data (strips the header from the PDU) and passes it to the relevant protocol processing cores for transmission. In some embodiments, the wrapper may be also do processing on the data before sending it for transmission.

FIG. 4 depicts an example of CAN/LIN/Ethernet PDU construction from original frame. The frame header may be used to in order to check the validity of the received frame, and also the CRC footer. After validity may be verified according to the respective protocol, the data payload may be transferred into the constructed PDU. The exemplary format used has a header containing 3 fields—PDU ID (4 byte), PDU length (4 byte) and destination ID (filled out by the PDU router). In addition, a 4 byte standard CRC may be used for the entire PDU. The CRC may be calculated according to the same method used in Ethernet frame (left shifting CRC32 BZcores2 with poly=0x4C11DB7, initial CRC=0xFFFFFFFF). If very large PDU as used (e.g. >10K bytes) a larger CRC will be required. PDU IDs are assigned according to a predefined ruleset which uses original frame header data (ID in case of may be and LIN, Dest. MAC in case of Ethernet) in order to define the constructed PDU ID. Source protocol in this exemplary ruleset may be (1—CAN-FD, 2—LIN, 3—Ethernet). In other embodiments the source interface ID (not interface type) may be used in this field as well. The reason for the source protocol/interface may be that a different ruleset may be used for different interfaces/protocols as IDs may be overlap between them (e.g. LIN frame with ID "1" and also may be ID of "1"). In this exemplary ruleset, 10 bytes are used for Orig. ID field to account for L3 cores frames as well, in this case the Dest. MAC together with the Dest. cores may be used together as the target address (6 byte MAC+4 byte coresv4). Values which start with "0x" are in hexadecimal format, other values are in binary format.

Figure 5:
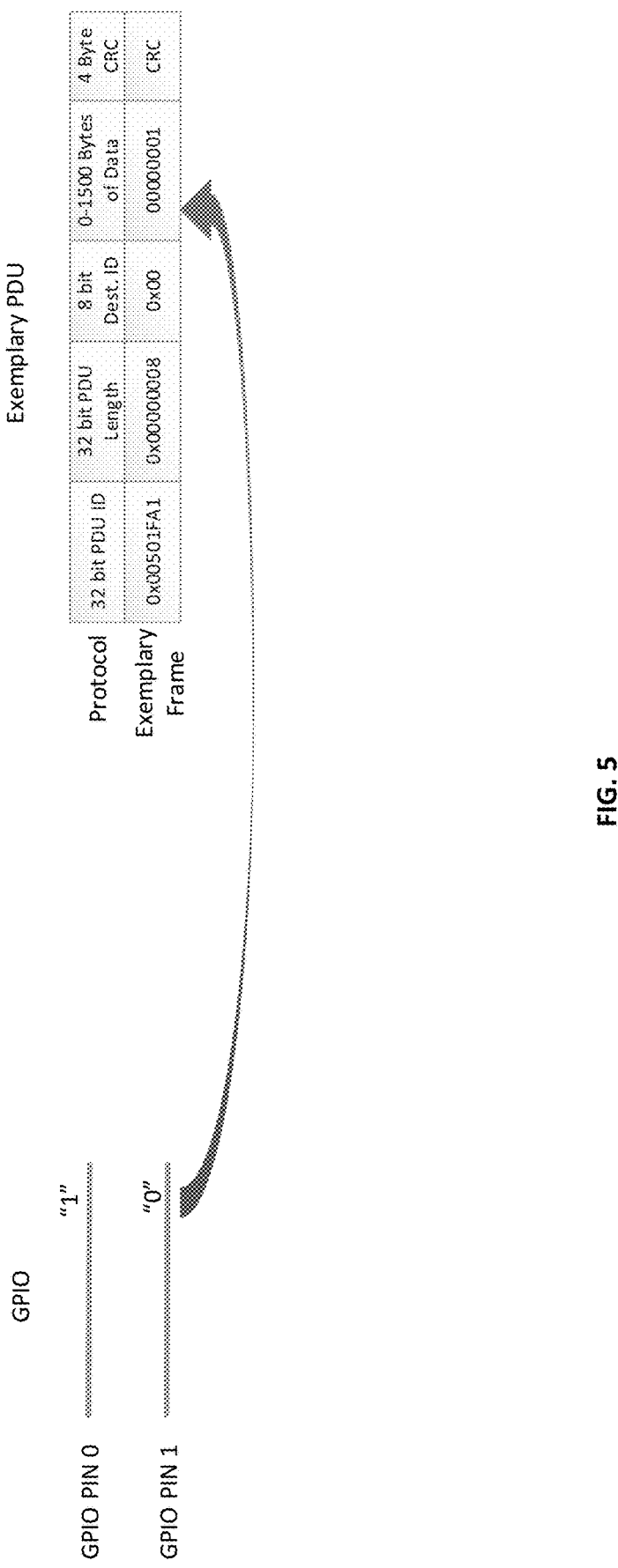
FIG. 5 depicts an example of GPIO PDU construction from original frame in accordance with one or more embodiments of the present disclosure.

FIG. 5 depicts an example of GPIO PDU construction from original frame. In this exemplary embodiment two GPIO signals are received, the first with a logical "1" and the second with logical "0". The bit values are packed in order into the data field of the PDU. Since the PDU size may be in bytes, one byte may be used for data and padded with 0s.

Figure 6:
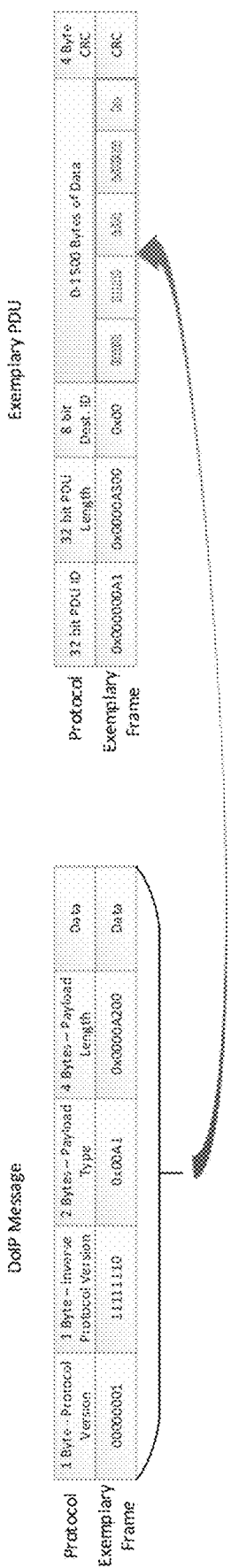
FIG. 6 depicts an example of PDU construction from a DoIP message in accordance with one or more embodiments of the present disclosure.

FIG. 6 depicts an example of PDU construction from a DoIP message. DoIP messages are typically L5 messages which are sent over cores protocol. Thus, the entire message may be put as a payload in the PDU.

FIG. 7 depicts an example of PDU destination ID tagging. The ruleset uses the PDU ID as the key and the value may be the destination interface ID. The PDU Router inserts the value into the PDU header.

Figure 8:
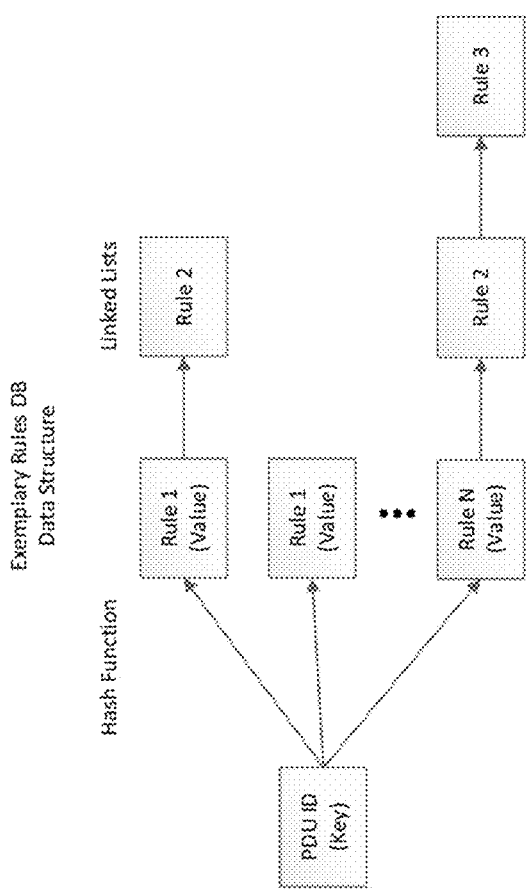
FIG. 8 depicts an example of Search Tables in accordance with one or more embodiments of the present disclosure.

FIG. 8 depicts an example of Search Tables. The PDU ID serves as the key to a hash table. An exemplary has function may be hashing by division with a fixed table size depending on the amount of PDU IDs in the system. Another embodiment may be use FKS Hashing. The value of the hash table for each PDU ID may be a linked list of rules. Each rule states the destination tag for the PDU ID under various parameters. For example, depending on the source interface where the frame which tuned into the PDU was received, a different routing may be used. Thus, each rule will contain the source interface and the resulting destination tag. In our exemplary embodiment as seen in the routing table in FIG. 7, there may be only one rule per PDU ID. Thus, the linked lists will be the size of 1 and contain only the destination tag per PDU ID. In other embodiments different types of data structures and representations may be used for the search table/Rules DB (e.g. dictionary, array, hash table with several layers, etc.). The advantage of this representation may be that the search may be done in fixed time which may be known and the size of the DB may be efficient compared to the amount of keys (generally amount of keys will be the size of the hash table).

Figure 9:
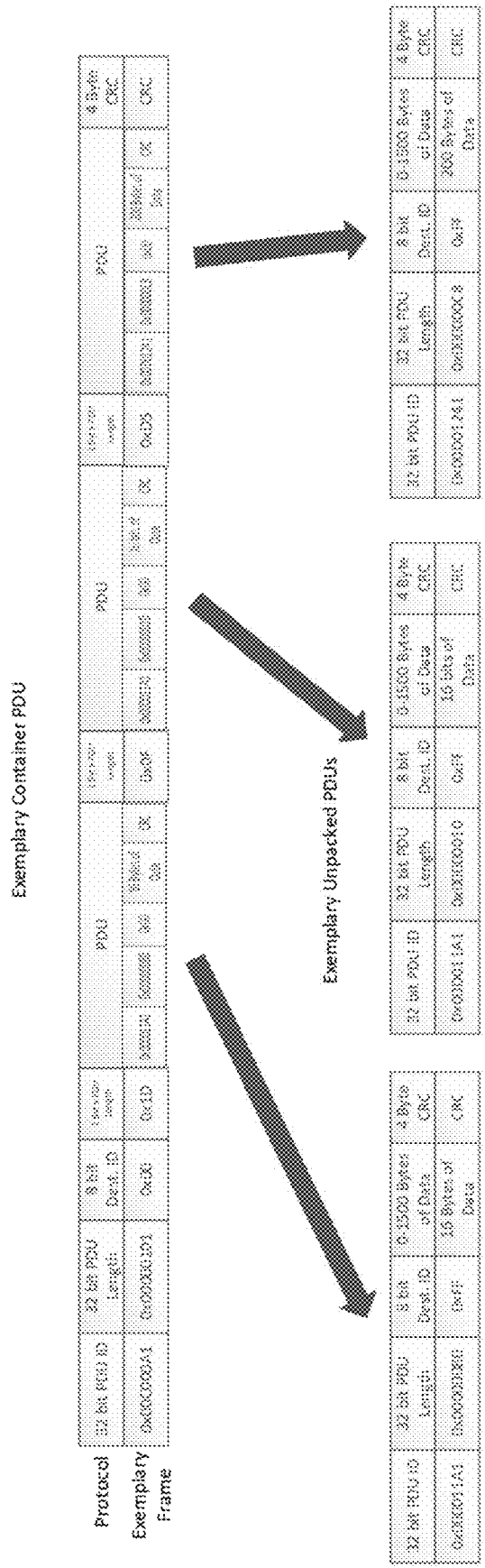
FIG. 9 depicts an example of Container PDU processing in accordance with one or more embodiments of the present disclosure.

FIG. 9 depicts an example of Container PDU processing. The exemplary container PDU packs 3 PDUs inside. Each Packed PDU has a length descriptor prior to it stating its full length in bytes (header+payload+crc). Thus, the Container PDU processor may be extract the complete PDU only. After the end of the payload may be reached according to the container PDU length field (which may be in its own header), the Container PDU Processor stops extracting PDU. Then each extracted PDU received a special tag (0xFF in this exemplary embodiment) which signals transmitter queue that it needs to go back into the PDU router.

It may be understood that at least one aspect/functionality of various embodiments described herein may be performed in real-time and/or dynamically. As used herein, the term "real-time" may be directed to an event/action that may be occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that may be dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/cores (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment may be implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor/FPGA, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software/hardware languages (e.g., Verilog, VHDL, C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, embedded computer, and so forth.

As used herein, term "server" should be understood to refer to a service point which provides processing, database, and communication facilities. By way of example, and not limitation, the term "server" may be refer to a single, physical processor with associated communications and data storage and database facilities, or it may be refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™, (33) Windows Runtime (WinRT™), (34) AUTOSAR™ Classic, (35) AUTOSAR™ Adaptive, or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., AES, IDEA, RC2, RC5, CAST and Skipjack), cryptographic hash algorithms (e.g., MD5, RcoresEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may be refer to a person who receives data provided by the data or service provider over the Internet in a browser session, or may be refer to an automated software application which receives the data and stores or processes the data. In some embodiments, the terms "user" can refer to the developer who is developing on the system.

The aforementioned examples are, of course, illustrative and not restrictive.

At least some aspects of the present disclosure will now be described with reference to the following numbered clauses.

Clause 1. A system, including: a communication routing device located within a vehicle; where the communication routing device may be an intermediary for a plurality of communication networks of the vehicle so that the communication routing device receives all electronic messages transmitted between the plurality of communication networks; where the plurality of communication networks of the vehicle includes a plurality of electronic control units (ECUs); where the communication routing device includes: at least one reception pipeline; where the at least one reception pipeline may be configured to: receive at least one layer 2/layer 3 (L2/L3) communication associated with the at least one L2/L3 communication protocol; extract communication data from the at least one L2/L3 communication according to at least one protocol specific layer L2/L3 processor associated with the at least one L2/L3 communication protocol; generate at least one Layer 4 and/or Layer 5 (L4/L5) data unit associated with the at least one L2/L3 communication based at least in part on the communication data; where the L4/L5 data unit includes a L4/L5 representation of the communication data; at least one rules database in communication with at least one of at least one processor, and/or at least one router; where the at least one rules database includes at least one predefined rule configured to define operations on the communication data by at least one of the at least one processor and/or the at least one router; the at least one processor; where the at least one processor may be configured to: ingest the at least one L4/L5 data unit; generate at least one transformed L4/L5 data unit based at least in part on at least one transformation to the at least one L2/L3 communication based at least in part on the at least one L4/L5 data unit and the at least one predefined rule associated with the at least one L4/L5 data unit; the at least one router; where the at least one router may be configured, based at least in part on the at least one predefined rule, to: determine at least one destination interface associated with the communication data based least in part on the at least one transformed L4/L5 data unit; determine at least one transmission pipeline associated with the at least one destination interface; route the at least one transformed L4/L5 data unit to the at least one transmission pipeline; the at least one transmission pipeline; where the at least one transmission pipeline may be configured to: extract the communication data from the at least one transformed L4/L5 data unit; generate at least one transmitted communication associated with the communication data according to at least one protocol specific L2/L3 transmission processor associated with the at least one L2/L3 communication protocol; where the at least one transmitted communication includes an L2/L3 representation of the communication data; transmit at least one transmitted communication associated with the at least one L2/L3 communication protocol via the at least one destination interface.

Clause 2. The system of clause 1, where the at least one L4/L5 data unit includes an AUTOSAR-compliant Protocol Data Unit (PDU).

Clause 3. The system of clause 2, where the communication routing device may be compliant with operation of an AUTOSAR PDU Router module.

Clause 4. The system of clause 1, where the at least one transformation includes at least one of: at least one data formatting, at least one protocol parameter definition, at least one communication control operation, at least one calculation on the data, or at least one security verification and/or acceleration.

Clause 5. The system of clause 1, where the at least one L2/L3 communication protocol includes at least one of: CAN, CAN-HS, CAN-FD, CAN-XL, LIN, Ethernet 10/100/1000Base-T1, Ethernet 10/100/1000Base-TX, 10Base-T1s, GPIO, RS232, USB, or Firewire.

Clause 6. The system of clause 1, where the at least one reception pipeline includes one communication protocol-specific reception pipeline per communication protocol-specific source L2/L3 interface.

Clause 7. The system of clause 1, where the at least one reception pipeline includes one communication protocol-specific reception pipeline per communication protocol.

Clause 8. The system of clause 1, where the communication routing device further includes: at least one container L4/L5 data unit processor configured to: receive the at least one L4/L5 data unit; extract a plurality of L4/L5 data sub-units packaged within the at least one L4/L5 data unit; and generate a plurality of L4/L5 data units associated with the plurality of L4/L5 data sub-units.

Clause 9. The system of clause 1, where the communication routing device further includes: at least one container L4/L5 data unit processor configured to: receive the at least one L4/L5 data unit, where the at least one L4/L5 data unit may be a plurality of L4/L5 data units; and generate a container L4/L5 data unit that nests the plurality of L4/L5 data sub-units into a single data unit.

Clause 10. The system of clause 1, where the communication routing device may be integrated into a single chip.

Clause 11. The system of clause 1, where the communication routing device may be integrated into an IP core on an FPGA.

Clause 12. The system of clause 1, where the communication routing device may be configured to intercept and route L2/L3 data traffic associated with a vehicle gateway.

Clause 13. The system of clause 1, where the communication routing device may be integrated into a vehicle to route L2/L3 data traffic associated with the vehicle gateway.

Clause 14. The system of clause 1, where the rules database is configured to be updated by over-the-air (OTA) update.

Clause 15. A method, including: receiving, by at least one reception pipeline of a communication routing device located within a vehicle, at least one layer 2/layer 3 (L2/L3) communication associated with the at least one L2/L3 communication protocol; where the communication routing device may be an intermediary for a plurality of communication networks of the vehicle so that the communication routing device receives all electronic messages transmitted between the plurality of communication networks; where the plurality of communication networks of the vehicle includes a plurality of electronic control units (ECUs); where the communication routing device includes at least one rules database storing at least one predefined rule configured to define operations on the communication data by the communication routing device; extracting, by the reception pipeline, communication data from the at least one L2/L3 communication according to at least one protocol specific layer L2/L3 processor associated with the at least one L2/L3 communication protocol; generating, by the reception pipeline, at least one Layer 4 and/or Layer 5 (L4/L5) data unit associated with the at least one L2/L3 communication based at least in part on the communication data; where the L4/L5 data unit includes an L4/L5 representation of the communication data; ingesting, by at least one processor of the communication routing device, the at least one L4/L5 data unit; generating, by the at least one processor, at least one transformed L4/L5 data unit based at least in part on at least one transformation to the at least one L2/L3 communication based at least in part on the at least one L4/L5 data unit and the at least one predefined rule associated with the at least one L4/L5 data unit; determining, by at least one router of the communication routing device, at least one destination interface associated with the communication data based least in part on the at least one transformed L4/L5 data unit; determining, by the at least one router, at least one transmission pipeline associated with the at least one destination interface; routing, by the at least one router, the at least one transformed L4/L5 data unit to the at least one transmission pipeline; extracting, by at least one transmission pipeline of the communication routing device, the communication data from the at least one transformed L4/L5 data unit; generating, by the at least one transmission pipeline, at least one transmitted communication associated with the communication data according to at least one protocol specific L2/L3 transmission processor associated with the at least one L2/L3 communication protocol; where the at least one transmitted communication includes an L2/L3 representation of the communication data; transmitting, by the at least one transmission pipeline, at least one transmitted communication associated with the at least one L2/L3 communication protocol via the at least one destination interface.

Clause 16. The method of clause 15, where the at least one L4/L5 data unit includes an AUTOSAR-compliant Protocol Data Unit (PDU).

Clause 17. The method of clause 15, where the communication routing device may be compliant with operation of an AUTOSAR PDU Router module.

Clause 18. The method of clause 15, where the at least one transformation includes at least one of: at least one data formatting, at least one protocol parameter definition, at least one communication control operation, at least one calculation on the data, or at least one security verification and/or acceleration.

Clause 19. The method of clause 15, where the at least one L2/L3 communication protocol includes at least one of: CAN, CAN-HS, CAN-FD, CAN-XL, LIN, Ethernet 10/100/1000Base-T1, Ethernet 10/100/1000Base-TX, 10Base-T1s, GPIO, RS232, USB, or Firewire.

Clause 20. The method of clause 15, where the at least one reception pipeline includes one communication protocol-specific reception pipeline per communication protocol-specific source L2/L3 interface.

Clause 21. The method of clause 15, where the at least one reception pipeline includes one communication protocol-specific reception pipeline per communication protocol.

Clause 22. The method of clause 15, further including: where the communication routing device further includes: receiving, by at least one container processor of the communication routing device, the at least one L4/L5 data unit; extracting, by the at least one container processor, a plurality of L4/L5 data sub-units packaged within the at least one L4/L5 data unit; and generating, by the at least one container processor, a plurality of L4/L5 data units associated with the plurality of L4/L5 data sub-units.

Clause 23. The method of clause 15, further including: where the communication routing device further includes: receiving, by at least one container processor of the communication routing device, the at least one L4/L5 data unit, where the at least one L4/L5 data unit may be a plurality of L4/L5 data units; and generating, by the at least one container processor, a container L4/L5 data unit that nests the plurality of L4/L5 data sub-units into a single data unit.

Clause 24. The method of clause 15, where the communication routing device may be integrated into a single chip.

Clause 25. The method of clause 15, where the communication routing device may be integrated into an IP core on an FPGA.

Clause 26. The method of clause 15, where the communication routing device may be configured to intercept and route L2/L3 data traffic associated with a vehicle gateway.

Clause 27. The method of clause 15, where the communication routing device may be integrated into a vehicle to route L2/L3 data traffic associated with the vehicle gateway.

Clause 28. The method of clause 15, where the rules database is configured to be updated by over-the-air (OTA) update.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What may be claimed is:

1. A system, comprising:
   a communication routing device located within a vehicle;
      wherein the communication routing device is an intermediary for a plurality of communication networks of the vehicle such that the communication routing device receives all electronic messages transmitted between the plurality of communication networks;
      wherein the plurality of communication networks of the vehicle comprises a plurality of electronic control units (ECUs);

wherein the communication routing device comprises:
  at least one reception pipeline;
    wherein the at least one reception pipeline is configured to:
      receive at least one layer 2, layer 3 or both (L2/L3) communication associated with the at least one L2/L3 communication protocol;
      extract communication data from the at least one L2, L3 or both communication according to at least one protocol specific layer L2, L3 or both processor associated with the at least one L2, L3 or both communication protocol;
      generate at least one Layer 4, Layer 5 or both (L4, L5 or both) data unit associated with the at least one L2, L3 or both communication based at least in part on the communication data;
      wherein the L4, L5 or both data unit comprises a L4, L5 or both representation of the communication data;
  at least one rules database in communication with at least one of at least one processor, or at least one router;
    wherein the at least one rules database comprises at least one predefined rule configured to define operations on the communication data by at least one of the at least one processor or the at least one router;
  the at least one processor;
    wherein the at least one processor is configured to:
      ingest the at least one L4, L5 or both data unit;
      generate at least one transformed L4, L5 or both data unit based at least in part on at least one transformation to the at least one L2, L3 or both communication based at least in part on the at least one L4, L5 or both data unit and the at least one predefined rule associated with the at least one L4, L5 or both data unit;
  the at least one router;
    wherein the at least one router is configured, based at least in part on the at least one predefined rule, to:
      determine at least one destination interface associated with the communication data based least in part on the at least one transformed L4, L5 or both data unit;
      determine at least one transmission pipeline associated with the at least one destination interface;
      route the at least one transformed L4, L5 or both data unit to the at least one transmission pipeline;
  the at least one transmission pipeline;
    wherein the at least one transmission pipeline is configured to:
      extract the communication data from the at least one transformed L4, L5 or both data unit;
      generate at least one transmitted communication associated with the communication data according to at least one protocol specific L2, L3 or both transmission processor associated with the at least one L2, L3 or both communication protocol;
      wherein the at least one transmitted communication comprises an L2, L3 or both representation of the communication data;
      transmit at least one transmitted communication associated with the at least one L2, L3 or both communication protocol via the at least one destination interface.

2. The system of claim 1, wherein the at least one L4, L5 or both data unit comprises an automotive open system architecture (AUTOSAR)-compliant Protocol Data Unit (PDU).

3. The system of claim 2, wherein the communication routing device is compliant with operation of an AUTOSAR PDU Router module.

4. The system of claim 1, wherein the at least one transformation comprises at least one of:
  at least one data formatting,
  at least one protocol parameter definition,
  at least one communication control operation,
  at least one calculation on the data, or
  at least one security verification, acceleration or both.

5. The system of claim 1, wherein the at least one L2, L3 or both communication protocol comprises at least one of:
  Controller Area Network (CAN),
  High Speed Controller Area Network (CAN-HS),
  Controller Area Network with Flexible Data Rate (CAN-FD),
  Controller Area Network Extra Long (CAN-XL),
  Local Interconnect Network (LIN),
  Ethernet 10/100/1000Base-T1,
  Ethernet 10/100/1000Base-TX,
  10Base-T1s,
  General Purpose Input-Output (GPIO),
  Recommended Standard 232 (RS232),
  Universal Serial Bus (USB), or
  Firewire.

6. The system of claim 1, wherein the at least one reception pipeline comprises one communication protocol-specific reception pipeline per communication protocol-specific source L2, L3 or both interface.

7. The system of claim 1, wherein the at least one reception pipeline comprises one communication protocol-specific reception pipeline per communication protocol.

8. The system of claim 1, wherein the communication routing device further comprises:
  at least one container L4, L5 or both data unit processor configured to:
    receive the at least one L4, L5 or both data unit;
    extract a plurality of L4, L5 or both data sub-units packaged within the at least one L4, L5 or both data unit; and
    generate a plurality of L4, L5 or both data units associated with the plurality of L4, L5 or both data sub-units.

9. The system of claim 1, wherein the communication routing device further comprises:
  at least one container L4, L5 or both data unit processor configured to:
    receive the at least one L4, L5 or both data unit, wherein the at least one L4, L5 or both data unit is a plurality of L4, L5 or both data units; and
    generate a container L4, L5 or both data unit that nests the plurality of L4, L5 or both data sub-units into a single data unit.

10. The system of claim 1, wherein the communication routing device is integrated into a single chip.

11. The system of claim 1, wherein the communication routing device is integrated into an intellectual property (IP) core on field programmable gate array (FPGA).

12. The system of claim 1, wherein the communication routing device is configured to intercept and route L2, L3 or both data traffic associated with a vehicle gateway.

13. The system of claim 1, wherein the communication routing device is integrated into a vehicle to route L2, L3 or both data traffic associated with the vehicle gateway.

14. The system of claim 1, wherein the rules database is configured to be updated by over-the-air (OTA) update.

15. A method, comprising:
receiving, by at least one reception pipeline of a communication routing device located within a vehicle, at least one layer 2, layer 3 or both (L2, L3 or both) communication associated with the at least one L2, L3 or both communication protocol;
wherein the communication routing device is an intermediary for a plurality of communication networks of the vehicle such that the communication routing device receives all electronic messages transmitted between the plurality of communication networks;
wherein the plurality of communication networks of the vehicle comprises a plurality of electronic control units (ECUs);
wherein the communication routing device comprises at least one rules database storing at least one pre-defined rule configured to define operations on the communication data by the communication routing device;
extracting, by the reception pipeline, communication data from the at least one L2 L3 or both communication according to at least one protocol specific layer L2, L3 or both processor associated with the at least one L2, L3 or both communication protocol;
generating, by the reception pipeline, at least one Layer 4, Layer 5 or both (L4, L5 or both) data unit associated with the at least one L2, L3 or both communication based at least in part on the communication data;
wherein the L4, L5 or both data unit comprises an L4, L5 or both representation of the communication data;
ingesting, by at least one processor of the communication routing device, the at least one L4, L5 or both data unit;
generating, by the at least one processor, at least one transformed L4, L5 or both data unit based at least in part on at least one transformation to the at least one L2, L3 or both communication based at least in part on the at least one L4, L5 or both data unit and the at least one predefined rule associated with the at least one L4, L5 or both data unit;
determining, by at least one router of the communication routing device, at least one destination interface associated with the communication data based least in part on the at least one transformed L4, L5 or both data unit;
determining, by the at least one router, at least one transmission pipeline associated with the at least one destination interface;
routing, by the at least one router, the at least one transformed L4, L5 or both data unit to the at least one transmission pipeline;
extracting, by at least one transmission pipeline of the communication routing device, the communication data from the at least one transformed L4, L5 or both data unit;
generating, by the at least one transmission pipeline, at least one transmitted communication associated with the communication data according to at least one protocol specific L2, L3 or both transmission processor associated with the at least one L2, L3 or both communication protocol;
wherein the at least one transmitted communication comprises an L2, L3 or both representation of the communication data;
transmitting, by the at least one transmission pipeline, at least one transmitted communication associated with the at least one L2, L3 or both communication protocol via the at least one destination interface.

16. The method of claim 15, wherein the at least one L4, L5 or both data unit comprises an automotive open system architecture (AUTOSAR)-compliant Protocol Data Unit (PDU).

17. The method of claim 15, wherein the communication routing device is compliant with operation of an automotive open system architecture (AUTOSAR) Protocol Data Unit (PDU) Router module.

18. The method of claim 15, wherein the at least one transformation comprises at least one of:
at least one data formatting,
at least one protocol parameter definition,
at least one communication control operation,
at least one calculation on the data, or
at least one security verification, acceleration or both.

19. The method of claim 15, wherein the at least one L2, L3 or both communication protocol comprises at least one of:
Controller Area Network (CAN),
High Speed Controller Area Network (CAN-HS),
Controller Area Network with Flexible Data Rate (CAN-FD),
Controller Area Network Extra Long (CAN-XL),
Local Interconnect Network (LIN),
Ethernet 10/100/1000Base-T1,
Ethernet 10/100/1000Base-TX,
10Base-T1s,
General Purpose Input-Output (GPIO),
Recommended Standard 232 (RS232),
Universal Serial Bus (USB), or
Firewire.

20. The method of claim 15, wherein the at least one reception pipeline comprises one communication protocol-specific reception pipeline per communication protocol-specific source L2, L3 or both interface.

21. The method of claim 15, wherein the at least one reception pipeline comprises one communication protocol-specific reception pipeline per communication protocol.

22. The method of claim 15, further comprising: wherein the communication routing device further comprises:
receiving, by at least one container processor of the communication routing device, the at least one L4, L5 or both data unit;
extracting, by the at least one container processor, a plurality of L4, L5 or both data sub-units packaged within the at least one L4, L5 or both data unit; and
generating, by the at least one container processor, a plurality of L4, L5 or both data units associated with the plurality of L4, L5 or both data sub-units.

23. The method of claim 15, further comprising: wherein the communication routing device further comprises:
receiving, by at least one container processor of the communication routing device, the at least one L4, L5 or both data unit, wherein the at least one L4, L5 or both data unit is a plurality of L4, L5 or both data units; and
generating, by the at least one container processor, a container L4, L5 or both data unit that nests the plurality of L4, L5 or both data sub-units into a single data unit.

24. The method of claim 15, wherein the communication routing device is integrated into a single chip.

25. The method of claim 15, wherein the communication routing device is integrated into an intellectual property (IP) core on field programmable gate array (FPGA).

26. The method of claim 15, wherein the communication routing device is configured to intercept and route L2, L3 or both data traffic associated with a vehicle gateway.

27. The method of claim 15, wherein the communication routing device is integrated into a vehicle to route L2, L3 or both data traffic associated with the vehicle gateway.

28. The method of claim 15, wherein the rules database is configured to be updated by over-the-air (OTA) update.

\* \* \* \* \*